(12) United States Patent
Matsuda et al.

(10) Patent No.: US 7,356,391 B2
(45) Date of Patent: Apr. 8, 2008

(54) DRIVE CONTROLLING APPARATUS AND METHOD FOR AUTOMOTIVE VEHICLE

(75) Inventors: Toshiro Matsuda, Kanagawa (JP); Hidetoshi Suzuki, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 593 days.

(21) Appl. No.: 10/820,059

(22) Filed: Apr. 8, 2004

(65) Prior Publication Data

US 2004/0204803 A1 Oct. 14, 2004

(30) Foreign Application Priority Data

Apr. 10, 2003 (JP) ............................. 2003-105999
Apr. 17, 2003 (JP) ............................. 2003-113278

(51) Int. Cl.
G06F 19/00 (2006.01)
B60K 17/356 (2006.01)
B60K 6/00 (2007.10)

(52) U.S. Cl. ......................... 701/22; 701/69; 180/65.2; 180/65.8; 903/921

(58) Field of Classification Search ..................... None
See application file for complete search history.

(56) References Cited

U.S. PATENT DOCUMENTS

| 4,042,055 A | * | 8/1977 | Ward ........................ 180/60 |
| 4,351,405 A | * | 9/1982 | Fields et al. ............... 180/65.2 |
| 4,953,646 A | * | 9/1990 | Kim ........................... 180/65.4 |
| 6,279,672 B1 | * | 8/2001 | Losego ...................... 180/65.1 |
| 6,295,487 B1 | * | 9/2001 | Ono et al. ..................... 701/22 |
| 2003/0010545 A1 | * | 1/2003 | Takeuchi ................... 180/6.28 |
| 2003/0064858 A1 | | 4/2003 | Saeki et al. |
| 2003/0089539 A1 | | 5/2003 | Kadota |
| 2003/0090225 A1 | * | 5/2003 | Posma et al. ............... 318/376 |
| 2003/0151381 A1 | | 8/2003 | Kadota et al. |
| 2003/0216215 A1 | | 11/2003 | Suzuki et al. |

FOREIGN PATENT DOCUMENTS

| JP | 8-133086 A | 5/1996 |
| JP | 2000-142157 A | 5/2000 |
| JP | 2000-318473 A | 11/2000 |

* cited by examiner

Primary Examiner—Michael J. Zanelli
(74) Attorney, Agent, or Firm—Foley & Lardner LLP

(57) ABSTRACT

In drive controlling apparatus and method for an automotive vehicle, at least one couple of road wheels constitutes one pair of parallel road wheels with respect to a vehicular width direction, a plurality of motors driving independently and separately each road wheel of the pair of parallel road wheels are provided, and a power supply supplies an electric power to the plurality of motors, the plurality of motors driving respective road wheels of the pair of parallel road wheels being enabled to constitute a serial circuit with respect to the power supply.

16 Claims, 17 Drawing Sheets

DRIVE CONTROLLING APPARATUS AND METHOD FOR AUTOMOTIVE VEHICLE

BACKGROUND OF THE INVENTION

1. Field of the Invention

The present invention relates to vehicular drive controlling apparatus and method which are capable of driving a whole or part of road wheels of the vehicle using electric motors.

2. Description of the Related Art

A Japanese Patent Application First Publication No. 2000-318473 published on Nov. 21, 2000 exemplifies a previously proposed vehicular drive controlling apparatus which drives a part of a plurality of road wheels with electric motors. In the previously proposed drive controlling apparatus, front left and right road wheels are driven by means of an engine and each of rear left and right road wheels is drive by a corresponding individual motor. Two motors driving the rear left and right road wheels respectively are disposed on a center portion of a vehicular width direction at a vehicular rear side, each motor being coupled to a corresponding road wheel via a corresponding speed-reduction unit. A power for the two motors is supplied from a (second) generator which is a power supply and an electronic control circuit controls a field current of each of the motors so as to govern an electromotive force and, furthermore, a generated driving force at each road wheel connected to the corresponding one of the two motors. Then, in the previously proposed vehicular drive controlling apparatus, the power supply as the second generator and two motors are electrically connected in parallel to each other.

SUMMARY OF THE INVENTION

However, since the motors driving individually and separately the respective left and right road wheels are disposed at the center portion of the vehicular width direction, a height of a floor at a rear portion accordingly becomes high. In addition, since the two motors are electrically connected in parallel to each other with respect to the power supply, armature current values of the two motors are differed due to variations in direct current resistance values and counter electromotive forces of the respective motors. Consequently, a difference between the generated driving forces of the left and right road wheels may occur. The driving force difference in the left and right road wheel connected motors gives an influence to a stability during a straight travel of the vehicle.

It is, therefore, an object of the present invention to provide drive controlling apparatus and method for an automotive vehicle which can improve the stability in the vehicular straight run using simple means even through the pair of left and right road wheels of the vehicle are individually and separately driven by means of drive motors.

According to one aspect of the present invention, there is provided with a drive controlling apparatus for an automotive vehicle, comprising: at least one couple of road wheels that constitutes one pair of parallel road wheels with respect to a vehicular width direction located on the same axis of the vehicular width direction; a plurality of motors driving independently and separately each road wheel of the pair of parallel road wheels; and a power supply to supply an electric power to the plurality of motors, the plurality of motors driving respective road wheels of the pair of parallel road wheels being enabled to constitute a serial circuit with respect to the power supply.

According to another aspect of the present invention, there is provided with a drive controlling method for an automotive vehicle, comprising: providing at least one couple of road wheels that constitutes one pair of parallel road wheels with respect to a vehicular width direction located on the same axis of the vehicular width direction; providing a plurality of motors driving independently and separately each road wheel of the pair of parallel road wheels; providing a power supply supplying an electric power to the plurality of motors; and enabling the plurality of motors driving respective road wheels of the pair of parallel road wheels to constitute a serial circuit with respect to the power supply.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

First Embodiment

Figure 1:
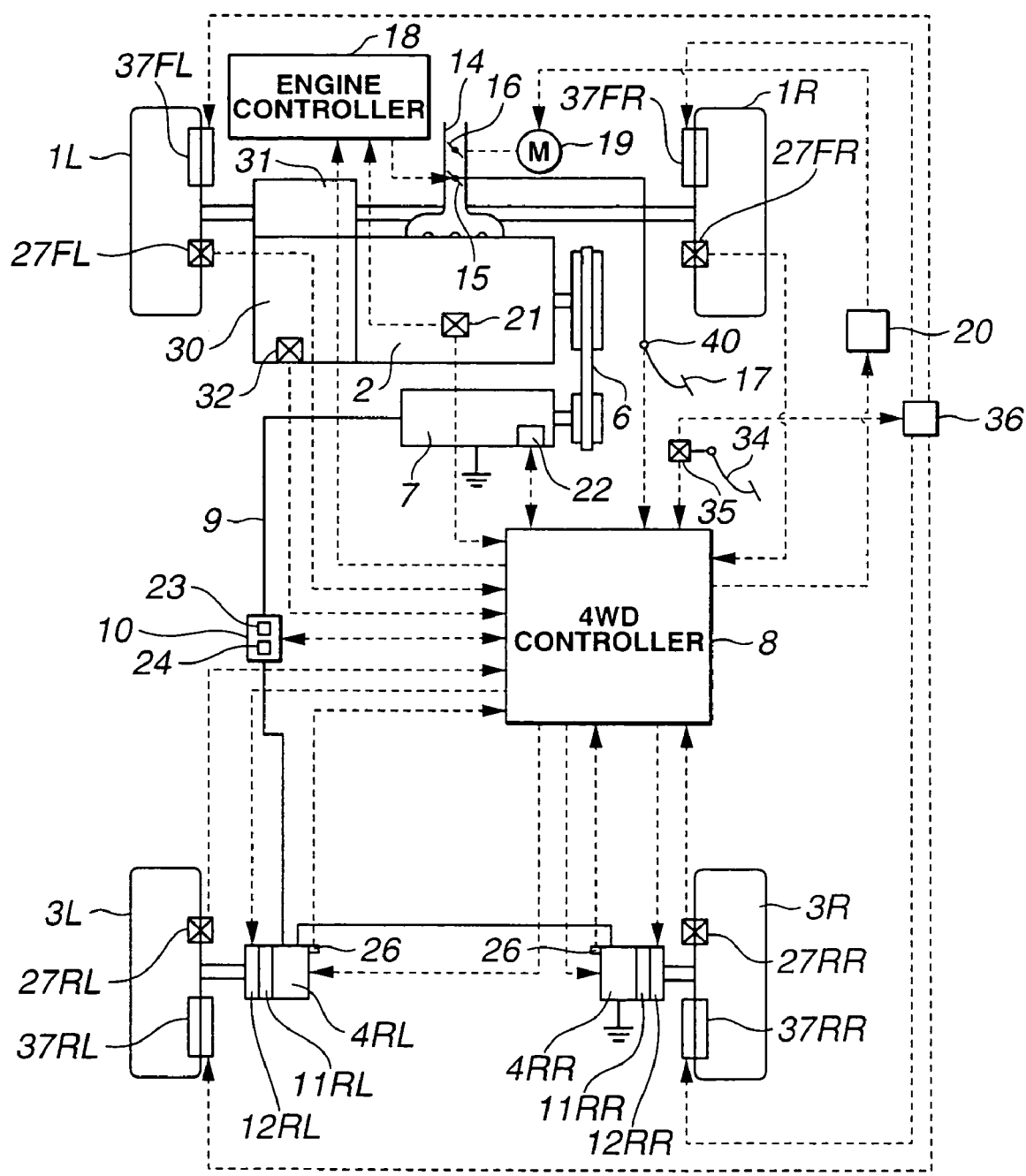
FIG. 1 is a rough configuration view of a drive controlling apparatus for an automotive vehicle in a first preferred embodiment according to the present invention.
Figure 2:
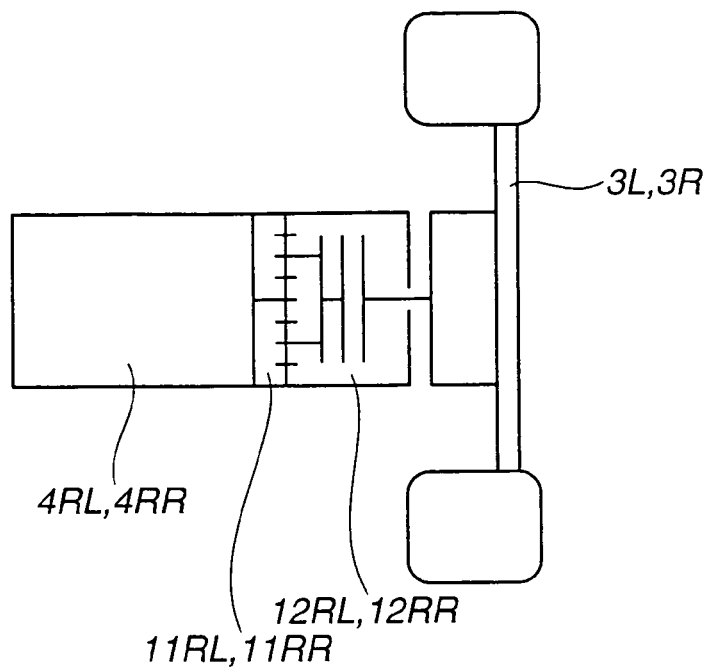
FIG. 2 is a configuration view representing a connection relationship between a road wheel to a corresponding motor in the first embodiment shown in FIG. 1.

FIG. 1 shows a rough configuration view of a vehicular system to which a drive controlling apparatus in a first preferred embodiment according to the present invention is applicable. As shown in FIG. 1, an automotive vehicle in the first embodiment has front left and right road wheels 1L and 1R driven by means of an engine (internal combustion engine) 2 and has each of rear left and right road wheels 3L and 3R driven individually and separately from each other by means of a corresponding one of drive motors 4RL and 4RR. In the first embodiment, drive axles of respective drive motors 4RL and 4RR are directly coupled to wheel axles of corresponding rear road wheels 3L and 3R via speed reducers 11RL and 11RR and clutches 12RL and 12RR. An output torque Te of engine 2 is transmitted to front left and right road wheels 1L and 1R via a transmission 30 and differential gear 31.

A shift position detector 32 is installed on transmission 30 to detect a present gear shift range and to output a detected gear shift position signal to a 4WD (four-wheel drive) controller 8. A main throttle valve 15 and sub throttle valve 16 are intervened in an intake-air tubular passage 14 of engine 2 (for example, intake manifold). A throttle opening angle of main throttle valve 15 is adjustably controlled in accordance with a depression depth (depression quantity) of an accelerator pedal 34 which is an accelerator opening angle command unit (acceleration command operation section). The throttle opening angle of main throttle valve 15 is adjustably controlled by means of a mechanical interlock to the depression depth of accelerator pedal 17 or by means of an electrical adjustable control with engine controller 18 in accordance with of a depression depth (quantity) (a detection value) of an accelerator (pedal) sensor 40 to detect the depression depth (quantity) of an accelerator pedal 17. The depression depth detection value of accelerator sensor 40 is outputted to 4WD controller 8. In addition, sub throttle valve 16 is linked with an actuator to actuate sub throttle valve 16, the actuator being constituted by a stepping motor 19 so that the opening angle of sub throttle valve 16 is adjustably controlled in accordance with a revolution angle of stepping motor 19 which accords with a number of steps in stepping motor 19. The revolution angle of stepping motor 19 is adjustably controlled in response to a drive signal from a drive motor controller 20. It is noted that a throttle sensor is installed on sub throttle valve 16 and on the basis of the detected value of the throttle opening angle detected by the throttle sensor, the number of steps of stepping motor 19 is feedback controlled. An adjustment of the throttle opening angle of sub throttle valve 16 is adjusted to be equal to or narrower than opening angle of main throttle valve 15 permits a control of an output torque of engine 2 independently of a manual operation (or manipulation) of the driver through the accelerator pedal.

In addition, an engine speed sensor 21 is installed in engine 2 to detect an engine speed and to output a engine speed indicative signal to engine controller 18 and 4WD controller 8. In FIG. 1, a reference numeral 34 denotes a brake pedal constituting s brake command operation section. A stroke quantity of brake pedal 34 is detected by brake stroke sensor 35. Brake stroke sensor 35 outputs a detected brake stroke quantity to brake controller 36 and 4WD controller 8. Brake controller 36 controls a braking force acted upon a vehicle in accordance with the inputted brake stroke quantity via brake units 37FL, 37FR, 37RL, and 37RR constituted by disc brakes equipped on respective road wheels 1L, 2R, 3L, and 3R. A part of revolution torque Te of engine 2 is transmitted to a generator 7 via an endless belt 6 and generator 7 is revolved at a number of revolution per minutes (revolution speed) Nh which is a multiplication of engine speed Ne of engine 2 with a pulley ratio.

Figure 3:
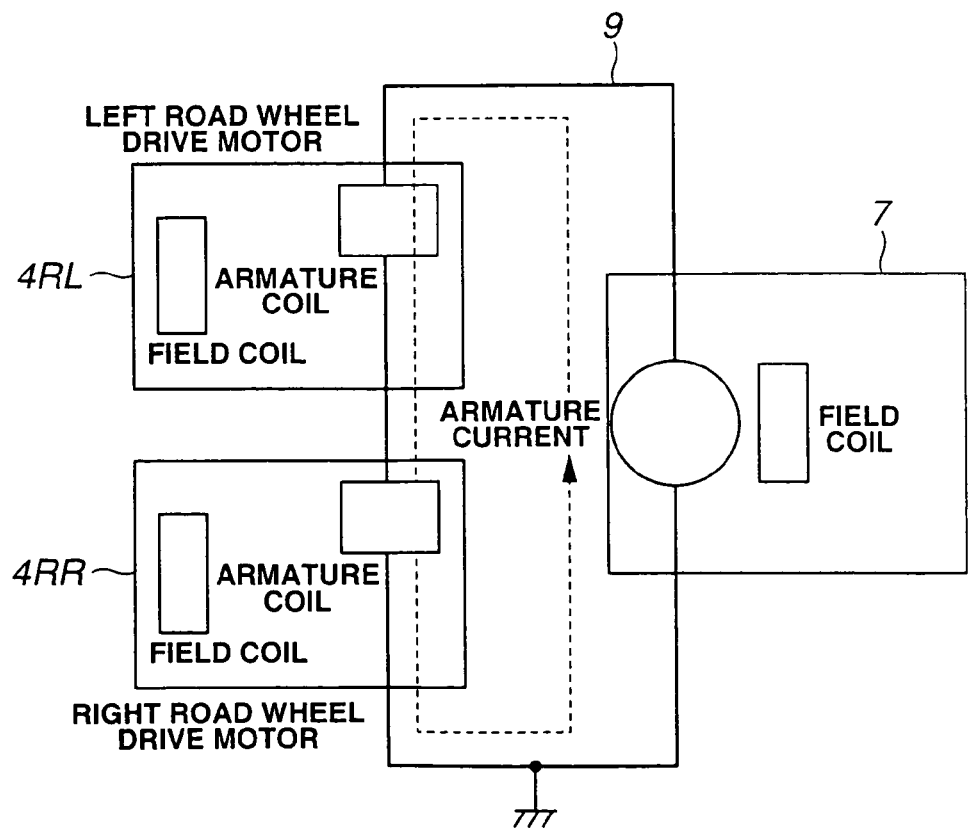
FIG. 3 is a configuration view representing a connection state between a generator and each motor in the first embodiment shown in FIG. 1.
Figure 4:
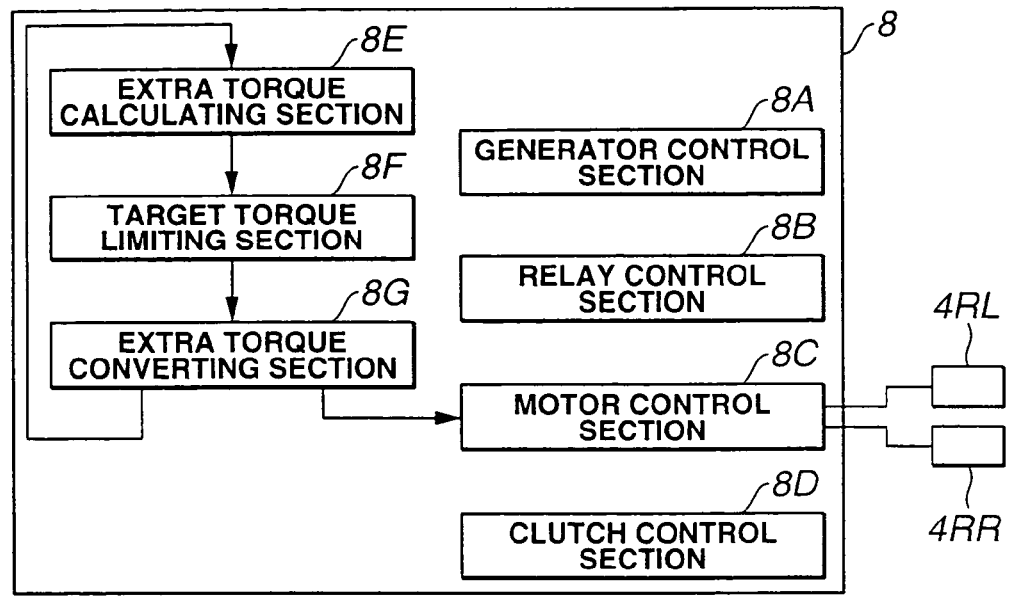
FIG. 4 is a functional block diagram of a 4WD (four-wheel drive) controller in the first embodiment shown in FIG. 1.

Generator 7 is equipped with a voltage regulator 22 (regulator) to adjust an output voltage V thereof. 4WD controller 8 controls a generator control command value c1 (namely, a pulse duty ratio) so that a field current $1fh$ causes a generator load torque Th and generated voltage V to be controlled. That is to say, voltage regulator 22 receives generator control command c1 (or a value of the field current) from 4WD controller 8, adjusts field current $1fh$ to a value which accords with generator control command c1 and is enabled to output the detected value of output voltage V to 4WD controller 8. It is noted that the number of revolutions per minutes Nh (revolution speed) of generator 7 can be calculated on the basis of the pulley ratio of engine speed Ne of engine 2. A power generated by means of its generator 7 is enabled to be supplied to two drive motors 4RL and 4RR via electric wire 9. Two motors 4RL and 4RR are serially connected as shown in FIG. 3. A junction box 10 is disposed in a midway through electric wire 9. A current sensor 23 is installed within junction box 10. Current sensor 23 detects a current value Ia flowing through electric wire 9 of the power supplied to two drive motors 4RL and 4RR from generator 7 and outputs an detected armature current signal to 4WD controller 8. In addition, a voltage value (voltage across drive motors 4RL and 4RR) through electric wire 9 is detected by 4WD controller 8. A reference numeral 24 denotes a relay and, via relay 24, a command issued from 4WD controller 8 serves to control an interruption and connection of the voltage (or current) supplied to drive motors 4RL and 4RR.

Furthermore, field currents of two drive motors 4RL and 4RR are individually and separately controlled in accordance with the command from 4WD controller 8 and an adjustment of each field current causes the corresponding one of the drive motors 4RL and 4RR of rear road wheels 3L and 3R to be adjusted. A revolution speed sensor 26 to detect a revolution speed (revolution per minutes) Nm of each of two drive motors 4RL and 4RR is provided and outputs a detected revolution speed signal of the corresponding one of the drive motors 4RL and 4RR to 4WD controller 8. Drive motor revolution sensor 26 is constituted by input axle revolution speed detecting means (section).

In addition, each clutch 12 is constituted by a hydraulic clutch or electromagnetic clutch and is in either a clutched (or connection) state or an interruption state in accordance with a clutch command issued from 4WD controller 8. Then, each road wheel 1L, 1R, 3L, and 3R is provided with a road wheel speed sensor 27FL, 27FR, 27RL, and 27RR. A pulse train signal in accordance with a corresponding one of the revolution speeds of the respective road wheels 1L, 1R, 3L, and 3R.

4WD controller 8 functionally includes: a generator control section 8A; a relay control section 8B; a motor control section 8C; a clutch control section 8D; an extra torque calculating section 8E; a target torque control section 8F; and an extra torque converting section 8G. Generator control section 8A outputs a generator command value c1 for generator 7 so as to adjust a field current Ifh while monitoring generated voltage V through voltage regulator 22. Relay control section 8B controls an interruption or connection of a power supply to drive motors 4RL and 4RR from generator 7. Clutch control section 8D controls states of clutches 12RL and 12RR by outputting a clutch control command to clutches 12RL and 12RR. In addition, for each predetermined sampling period of time, on the basis of each signal inputted, the process is circulated in an order of extra torque calculating section 8E, target torque limiting section 8F, and an extra torque converting section 8G.

Figure 5:
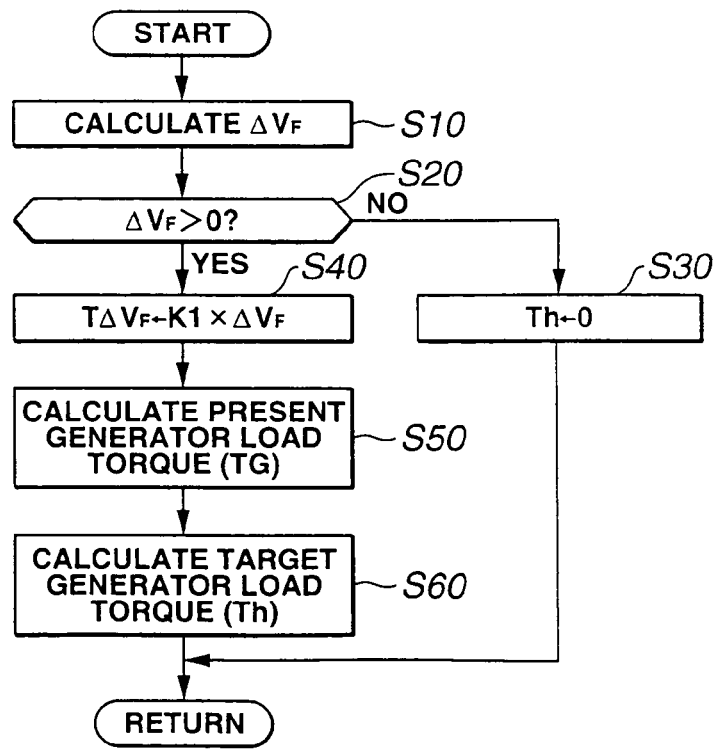
FIG. 5 is an operational flowchart representing a process of an extra torque calculating section of 4WD controller shown in FIG. 4.

Next, extra torque calculating section 8E carries out such a process as described with reference to a flowchart of FIG. 5. That is to say, at a step S10, extra torque calculating section 8E subtracts road wheel velocities of rear road wheels 3L and 3R (non-driven wheels) from road wheel velocities of front road wheels 1L and 1R (main driven wheels) to derive slip velocity ΔVF which is an acceleration slip quantity of each front road wheel 1L and 1R and the routine shown in FIG. 5 goes to a step S20. It is noted that slip velocity ΔVF is calculated as follows: For example, an average front road wheel velocity VWf which is an average value of the left and road wheel velocities of front road wheels 1L and 1R and an average rear road wheel velocity VWr which is an average value of the left and right road wheel velocities 3L and 3R is calculated in the following equation.

$VWf=(VWfl+VWfr)/2$ $VWr=(VWrl+VWrr)/2$

Next, slip velocity (acceleration slip quantity) ΔVF of front left and right road wheels 1L and 1R which are main driven wheels is calculated from a deviation between average front road wheel velocity VWf and average rear road wheel velocity VWr using the following equation.

$\Delta VF=VWf-VWr$

At step S20, derived slip quantity ΔVF is larger than a predetermined value, for example, zero. If ΔVF≦0 (No) at step S20, the routine goes to a step S30 since extra torque calculating section 8E estimates that front road wheels 1L and 1R are not in the acceleration slip state. At step S30, zero is substituted into Th (as will be described later) and the routine is returned to step S10. On the other hand, if ΔVF>0 (Yes) at step S20, since either of front road wheels 1L or 1R is under an acceleration slip condition, the routine goes to a step S40. At step S40, extra torque calculating section 8E calculates an absorption torque TΔVF required to suppress an acceleration slip of front road wheels 1L and 1R using the following equation and the routine goes to a step S50. TΔVF=K1×ΔVF, wherein K1 denotes a gain derived through experiments. At a step S50, extra toque calculating section. 8E calculates a load torque TG of the present generator 7 on the basis of the following equation and the routine goes to a step S60.

$$TG = K2 \times \frac{V}{K3} \times \frac{Ia}{Nh}$$

wherein V denotes voltage across generator 7, Ia denotes an armature current flowing through generator 7, Nh denotes a revolution speed of generator 7, K3 denotes a predetermined efficiency, and K2 denotes a predetermined coefficient. At step S60, extra torque calculating section 8E calculates the extra torque, viz., a target load torque Th to be loaded by generator 7 and the routine is returned to step S10.

$Th=TG+T\Delta VF$

Figure 6:
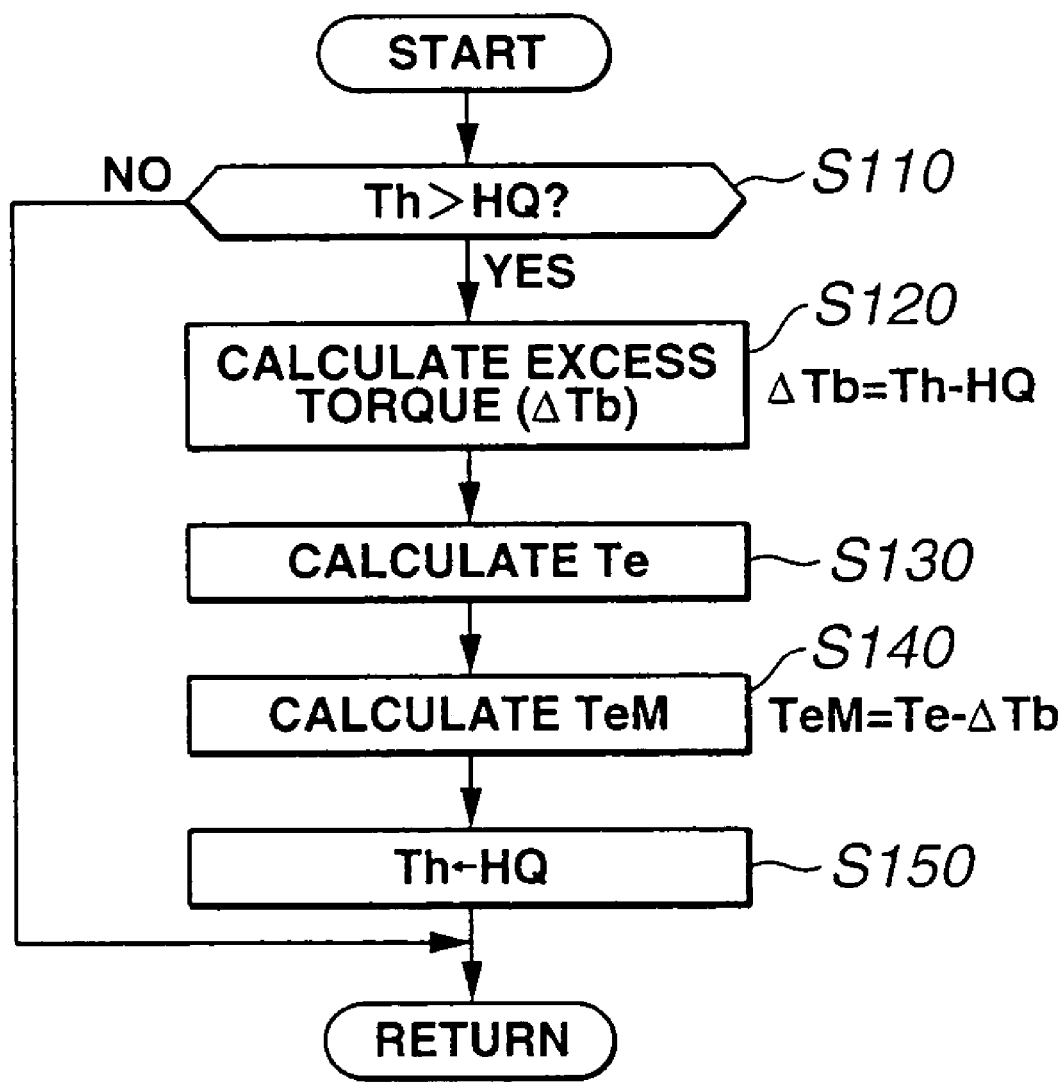
FIG. 6 is an operational flowchart representing a process of a target torque controlling section of 4WD controller shown in FIG. 4.

Next, a process of target torque limiting section 8F will be described on the basis of a flowchart of FIG. 6. That is to say, at a step S110, target torque limiting section 8F determines whether target generator load torque Th is larger than a maximum load capacity HQ of generator 8. If target torque limiting section 8F determines that target generator load torque Th is equal to or below maximum load capacity HQ, the routine is returned the original step, namely, step S110. If target torque limiting section 8F determines that target generator load torque Th is larger than maximum load capacity HQ of generator 7 (Yes), the routine goes to a step S120. At step S120, an extra torque ΔTb is determined which exceeds maximum load capacity HQ at target generator load torque Th using the following equation and the routine goes to a step S130.

$\Delta Tb=Th-HQ$

At step S130, extra torque calculating section 8E calculates a present engine speed Te on the basis of signals outputted from engine speed sensor 21 and throttle sensor. At a step S140, extra torque calculating section 8E calculates an engine torque upper limit value TeM which is a subtraction of extra torque ΔTb from engine torque Te. Derived engine torque upper limit value TeM is outputted to engine controller 18. Thereafter, the routine goes to a step S150.

$TeM=Te-\Delta Tb$

At step S150, maximum load capacity HQ is substituted into target generator load torque Th and the routine is returned to step S110 for the predetermined sampling period Next, extra torque converting section 8G will be described with reference to a flowchart of FIG. 7. It is noted that a whole or part of the processes at extra torque converting section 8G will be carried out individually for each drive motor. At first, extra torque converting section 8G determines if target generator load torque Th is larger than zero (0). If Th≦0 (No) at step S200, the routine is returned to the same step. If Th>0 (Yes) at step S200, the acceleration slip occurs at each of front road wheels 1L and 1R and the routine goes to a step S220. At step S220, extra torque converting section 8G inputs revolution speed Nm of each of drive motors 4RL and 4RR detected by means of drive motor revolution speed sensor 21, calculates a target drive motor field current Ifm in accordance with revolution speed Nm of each of drive motors 4RL and 4RR, and outputs target drive motor field current Ifm to an electric motor control section 8C. Then, the routine goes to a step S230.

In a case where target drive motor field current Ifm with respect to revolution speed Nm of drive motors 4RL and 4RR provides a constant predetermined current value in a case where revolution speed Nm is equal to or lower than a predetermined revolution speed. If either of drive motors 4RL and 4RR is equal to or higher than a predetermined revolution speed, a well known field weakening control causes field current Ifm to be made smaller. That is to say, since the drive motor torque is reduced due to a rise in an induced voltage E of drive motors 4RL and 4RR when drive motors 4RL and 4RR are revolved at high speeds, as described above, field current Ifm is made small to reduce an induced voltage E when revolution speed Nm of each of drive motors 4RL and 4RR becomes high. As a result of this, drive motors 4RL and 4RR give high-speed revolutions so as to suppress a rise in induced voltage E of drive motors 4RL and 4RR. Thus, a reduction of drive motor torque is suppressed. Hence, a required drive motor torque can be obtained. In addition, a two-stage control between lower than a predetermined engine speed and a predetermined revolution speed or higher can be achieved. Thus, a control purpose electronic circuit can be inexpensive as compared with a continuous field current control.

It is noted that a drive motor torque correcting section may be installed in which field current Ifm is adjusted in accordance with revolution speeds Nm of drive motors 4RL and 4RR with respect to a required drive motor torque so that the drive motor torque is continuously corrected. That is to say, field current Ifm of each drive motor 4RL and 4RR may be adjusted in accordance with revolution speed Nm of the corresponding one of drive motors 4RL and 4RR for the two-stage switching. Consequently, even if drive motors 4RL and 4RR are revolved at high speeds, a rise in induced voltage E of each drive motor 4RL and 4RR is suppressed and the reduction in drive motor torque is suppressed. Hence, a required drive motor torque can be obtained. In addition, since a smooth drive motor torque characteristic can be obtained, the vehicle can be stabilized during the vehicular run as compared with the two stage control and a drive efficiency of each of drive motors 4RL and 4RR can always be in a favorable state.

Figure 7:
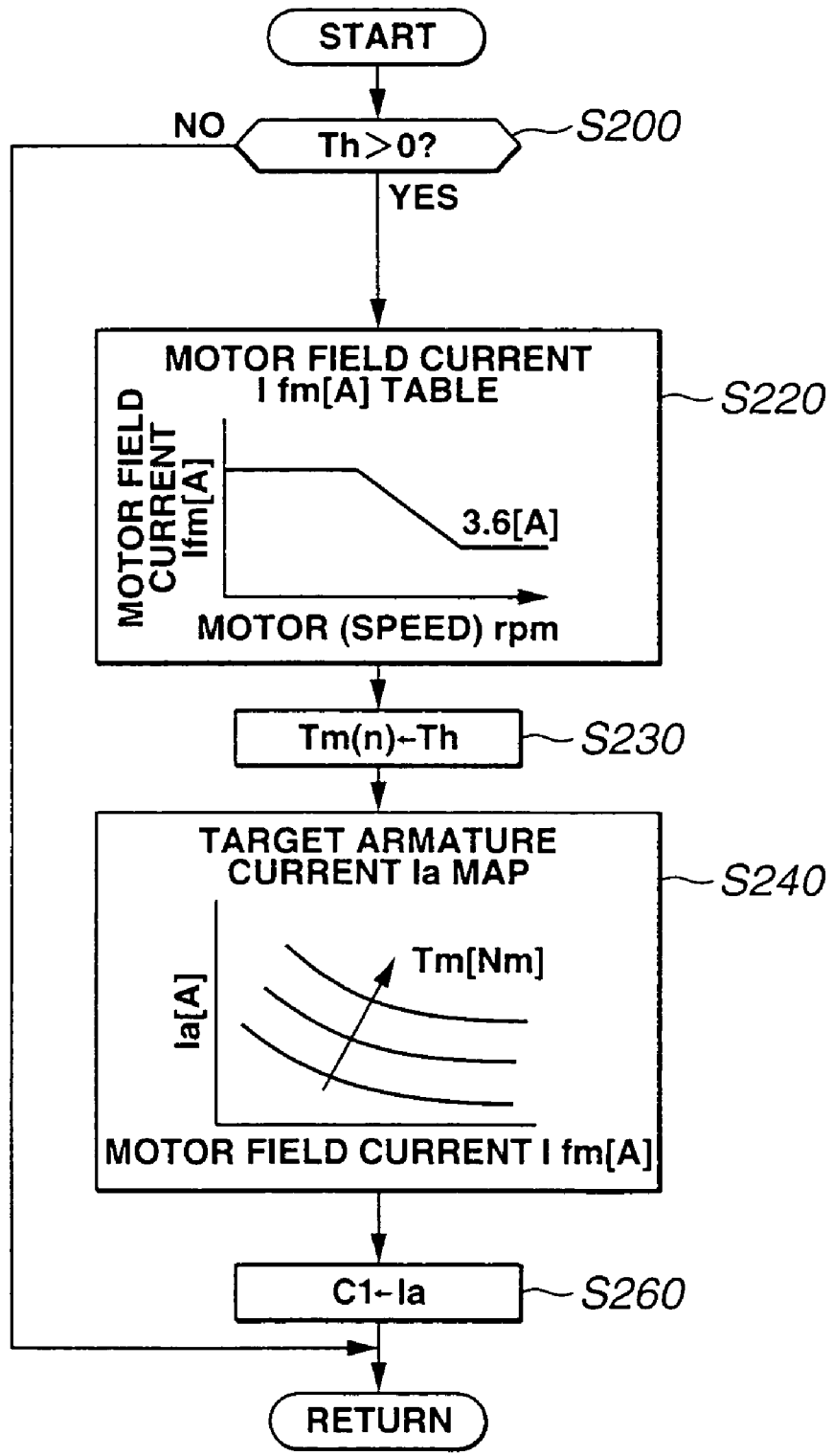
FIG. 7 is an operational flowchart representing a process of an extra torque converting section of 4WD controller shown in FIG. 4.

Next, at step S230 of FIG. 7, extra torque converting section 8E calculates a target drive motor torque Tm(n) corresponding to a map on the basis of target generator load torque Th calculated by extra torque calculating section 8E and the routine goes to a step S240. At step S240, torque converting section 8E calculates a corresponding target armature current Ia on the basis of a map with target drive motor torque Tm(n) and target drive motor field current Ifm as parameters. At a step S260, extra torque converting section 8E is returned after extra torque converting section 8E calculates pulse signal duty ratio c1 which is a generator control command value on the basis of target armature current Ia and outputs duty ratio cl and the routine is returned to step S200.

Next, a process of motor controlling section 8C will be described below. Motor controlling section 8C adjusts field currents Ifm of respective two motors 4RL and 4RR so as to coincide with target drive motor field current Ifm derived by extra torque converting section. Consequently, the torques of two drive motors 4RL and 4RR are respectively adjusted so that torques of drive motors 4RL and 4RR are adjusted to required values.

Figure 8:
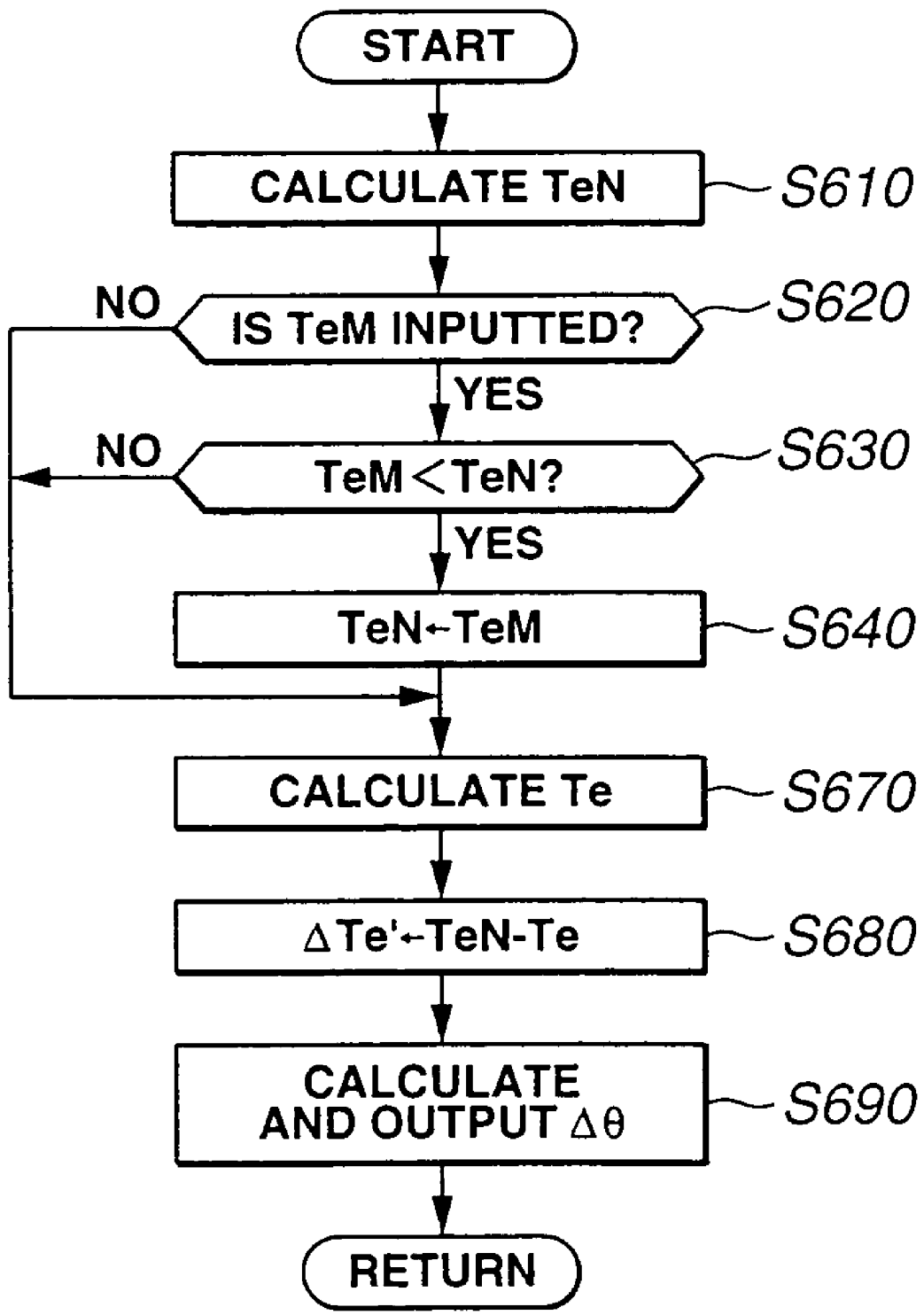
FIG. 8 is an operational flowchart executed by an engine controller shown in FIG. 1.
Figure 9:
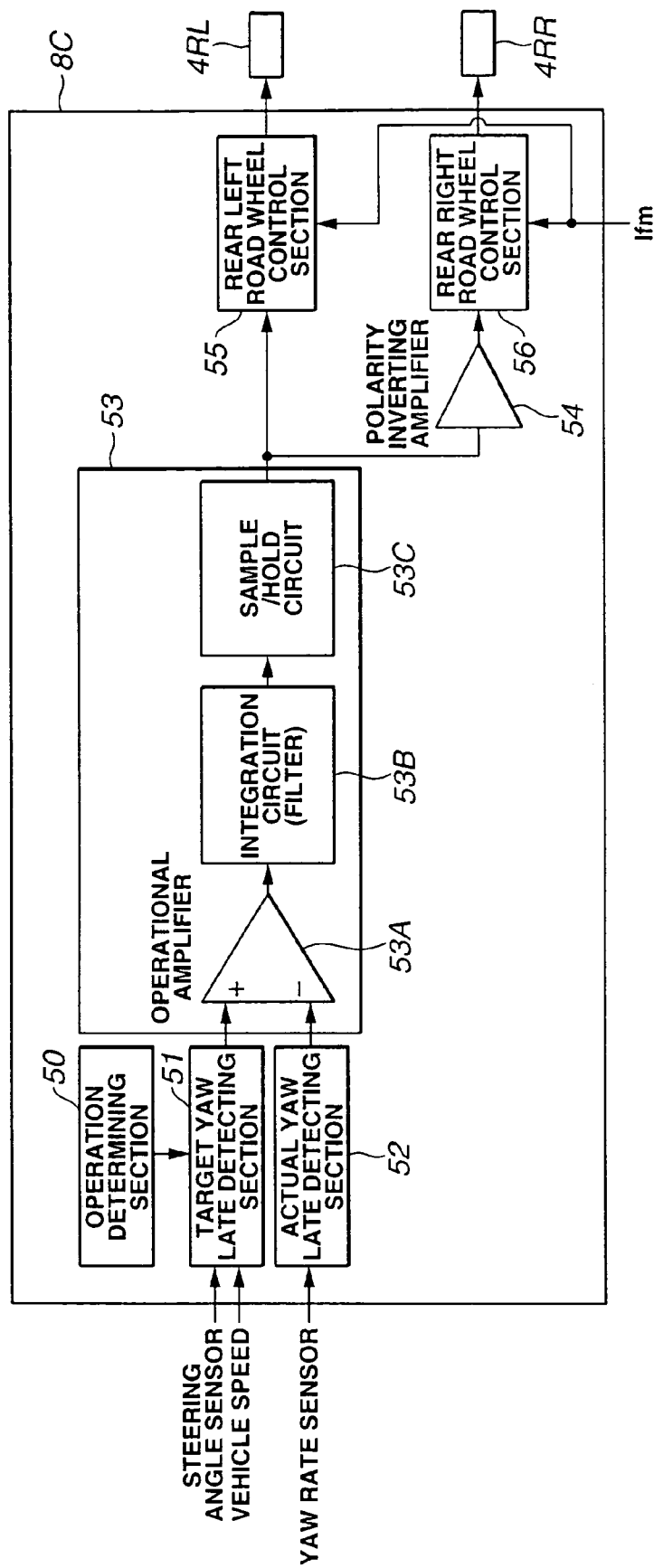
FIG. 9 is a circuit block diagram of a motor controlling section in a second preferred embodiment of the drive controlling apparatus according to the present invention.

Next, a process of engine controller 18 will be described below. Engine controller 18 performs the processing as shown in a flowchart of FIG. 8 on the basis of the input respective signals. That is to say, at a step S610, engine controller 18 calculates a target output torque TeN that the driver has requested on the basis of a detection signal from accelerator sensor 40 and the routine goes to a step S620. At step S620, 4WD controller 8 determines whether an input of a limit output torque TeM from 4WD controller 8 is present or not. If the input of TeM is present (Yes), the routine goes to a step S630. On the other hand, if no input of limit output torque TeM is present (No) at step S620, the routine goes to a step S670. At step S630, engine controller 8 determines whether target output torque TeN is larger than a limit output torque TeM. If target output torque TeN is larger than limit output torque TeM, the routine goes to a step S640. On the other hand, if target output torque TeN is equal to or smaller than limit output torque TeM, the routine goes to step S670. At step S640, engine controller 8 substitutes limit output torque TeM into target output torque TeN to decrease target output torque TeN and the routine goes to step S370. At step S670, engine controller 8 calculates the present output torque Te on the basis of throttle opening angle and engine revolution speed and the routine goes to a step S680. At step S680, engine controller 8 outputs a deviation ΔTe' between target output torque TeN with respect to a present output torque Te on the basis of the following equation and the routine goes to a step S690.

$$\Delta Te' = TeN - Te$$

At step S690, engine controller 8 calculates a variation of Δθ of throttle opening angle θ and outputs the opening angle signal corresponding to variation Δθ of the throttle valve to stepping motor 19 and the routine is returned to step S610.

Next, an action of the drive control apparatus in the first embodiment described above will be described below.

If due to the large depression depth (quantity) of accelerator pedal 17 with the driver or due to a small road surface frictional coefficient μ, a torque transmitted from engine 2 to front road wheels 1L and 1R is larger than a road surface reactive force limit torque transmitted to front road wheels 1L and 1R, viz., if front road wheels 1L and 1R which are main drive wheels are acceleration slips, each clutch 12RL and 12RR is connected and generator 7 is generated at generator load torque Th which accords with the acceleration slip quantity. Thus, the vehicle is transferred to a four wheel drive (4WD) state. Subsequently, the drive torque transmitted to each front road wheel 1L and 1R is adjusted to approach to a road surface reaction limit torque of front road wheels 1L and 1R so that the vehicle falls in a two wheel drive (2 WD) state. Consequently, the acceleration slip is suppressed on front road wheels 1L and 1R which are main drive wheels.

In addition, drive motors 4RL and 4RR are driven by means of extra power generated by generator 7 and non-driven wheels of rear road wheels 3L and 3R are driven. Thus, a vehicular acceleration characteristic is improved. At this time, since drive motors 4RL and 4RR are driven by means of extra torque exceeding the road surface reactive force limit torque of main driven wheels 1L and 1R, the energy efficiency is improved and a fuel consumption is improved.

When the vehicle falls in the four-wheel drive state, the armature current is supplied to left and right road wheels 4RL and 4RR from generator 7 which is a common power supply. As shown in FIG. 3, as a result of the fact that left drive motors 4RL and 4RR are serially connected to generator 7, the armature current of left and right drive motors 4RL and 4RR is mutually the same so that a drive torque of left and right drive motors 4RL and 4RR has the same value and, furthermore, driving forces developed at left and right road wheels driven by means of the respective drive motors 4RL and 4RR becomes mutually the same value. Consequently, although rear left and right road wheels 3L and 3R are separately and individually driven by means of the motors, a straight line stability of the vehicle is improved during the straight run of the vehicle. In addition, as a result of the fact that left and right drive motors 4RL and 4RR are disposed in proximities of the corresponding road wheels, viz., as the result of the fact that two drive motors 4RL and 4RR are not disposed at a center portion of the vehicle, viz., a floor space, with a floor located at a rear side of a vehicle body lowered, can be enlarged. However, left and right drive motors 4RL and 4RR may be disposed at the center portion in a vehicular width direction.

It is noted that, in the first embodiment, rear left and right road wheels 3L and 3R are driven in a case where the front wheels are in the acceleration slip state. However, the present invention is applicable to a system where the drive state is transferred to the 4WD state in accordance with the accelerator opening angle. In addition, a 4WD switch may be provided, 4WD switch being capable of switching the drive state of the vehicle between the 2 WD (two-wheel drive) state and 4WD (four-wheel drive) state. That is to say, the driving control of drive motors 4RL and 4RR is not limited to the above-described control.

Furthermore, drive motors 4RL and 4RR are driven by a voltage V developed by generator 7 so as to constitute the 4WD state, in the first embodiment. However, the present invention is not limited to this. The present invention is applicable to a system in which a common battery which is capable of supplying the power to two drive motors 4RL and 4RR. In this case, the electrical power may be supplied from both of the battery and the generator. Or alternatively, although the internal combustion engine is exemplified as the main drive source, in the first embodiment, a motor may be constituted by the main drive source.

Second Embodiment

Next, a second preferred embodiment of the drive controlling apparatus will be described with reference to the drawings. The same reference numerals as those described in the first embodiment designate the like elements in the second embodiment. A basic structure in the second embodiment is generally the same as described in the first embodiment. A difference point is a process of motor controlling section 8C.

Motor controlling section 8C in the second embodiment, includes: an operation determining section 50; a target yaw rate detecting section 51; an actual yaw rate detecting section 52; deviation calculating section 53; a polarity inverting amplifier 54; a rear left road wheel controlling section 55; and a rear right road wheel controlling section 56. Deviation calculating section 53 constitutes a driving force difference detecting section (means). Polarity inverting amplifier 54, rear left road wheel controlling section 55, and rear right road wheel controlling section 56 constitutes a field current correcting section (means).

Operation determining section 50 determines whether a field current command value for each of two drive motors 4RL and 4RR should be corrected or not. When operation determining section determines that conditions described in items of ① through ③ are satisfied, the correction for the field current command value is carried out and the operation determining section 50 outputs activation commands to target yaw rate detecting section 51 and actual yaw rate detecting section 52. In addition, when at least one of the following conditions of ① through ③ is not satisfied, operation determining section 50 issues a stop command. ① Th>0, viz., generator 7 is generated and the vehicle falls in the 4WD drive state; ② A forced brake control such as a TCS (Traction Control System) control is not carried out; and ③ A steering angle of the steering wheel is in a proximity to zero, in other words, an absolute value of the steering wheel falls within a predetermined angle. A predetermined angle indicates within an operating variable of the steering wheel that the vehicle driver instructs the vehicle to make a straight run.

Next, target yaw rate detecting section 51 starts the operation to input the activation command, inputs the detection value of the steering angle from steering angle sensor, inputs the vehicle speed from the vehicle speed sensor, and calculates a target yaw rate by means of a well known calculation. The calculated yaw rate is continuously outputted to deviation calculating section 53. In the same manner, actual yaw rate detecting section 52 outputs actual yaw rate value to deviation calculating section 53 on the basis of the signal derived from yaw rate sensor.

Deviation calculating section 50 calculates a deviation between the inputted target yaw rate and the actual yaw rate, outputs directly a value in accordance with the deviation quantity to rear left road wheel controlling section 55, and polarity inverting amplifier 54 inverts the polarity of the value which accords with the deviation quantity, and the inverted value is supplied to rear right road wheel controlling section 56. It is noted that deviation calculating section 53 includes: an operational amplifier 53A having two positive and negative input ends; an integration circuit 53B; and a sample/hold circuit 53C. Operational amplifier 53A determines a deviation quantity with a plus value in a case where the actual yaw rate has the tendency of a right turn rather than the target yaw rate and a minus value in a case where the actual yaw rate has the tendency of a left turn rather than the target yaw rate. Subsequently, integration circuit 53B eliminates AC components using a filter having a time constant of about one second. A sample/hold circuit 53C serves to process a hold of a value immediately before the integration in a case where the vehicular road wheel slip occurs or the steering angle is equal to or wider than a predetermined steering angle.

Next, rear left road wheel controlling section 55 controls the drive motor field current in such a way that an addition value of target drive motor field current Ifm derived by extra torque converting section 8G into a deviation value inputted from deviation calculating section 53 to target drive motor field current Ifm so as to give the motor field current of each of rear left road wheel drive motor 4RL. In addition, rear right road wheel controlling section 56 controls the motor field current in such a way that an addition value of target drive motor field current Ifm derived by extra torque converting section 8G into a deviation value inputted from deviation calculating section 53 to target drive motor field current Ifm so as to give the motor field current of each of rear right road wheel drive motor 4RR.

Next, an action and advantage of the drive controlling apparatus in the second embodiment will be described later. Theoretically, as described in the first embodiment, during the straight run state, the drive torques of left and right road wheel drive motors 4RL and 4RR should be equal. However, due to differences in the mechanical efficiency and magnetic field efficiency, the difference in the drive torques between the left and right drive motors 4RL and 4RR may occur. Whereas, in the second embodiment, according to a deviation between the target yaw rate and the actual yaw rate, a value in accordance with the generated driving force differences of the left and right drive motors 4RL and 4RR and the field current value of each of left and right drive motors 4RL and 4RR is accordingly corrected in such a direction toward which the deviation becomes small. Hence, the stability in the straight run of the vehicle is improved.

Suppose that the correction of the field current is carried out during a vehicular run in a grip range without execution of the TCS control so that an influence of an unbalance between the left and right sides of a road surface frictional coefficient is not given. Furthermore, the correction of the field current is carried out only in a case where the steering angle is placed in the vicinity to zero so that the deviation is not detected due to the yaw rate during the turning. In addition, the correction of the field current is corrected in such a way that the absolute value of the correction quantity of the field current has the same value as those of the left and right drive motors 4RL and 4RR so that a variation of the field current does not change the sum of the terminal voltages between the two motors. The correction value of the left and right field currents is the polarity of one value inverted. Hence, the calculation is easy. The other structure, action, and advantage are the same as those described in the first embodiment.

Third Embodiment

Next, a third preferred embodiment of the drive controlling apparatus according to the present invention will be described below. The same reference numerals as those described in the first embodiment designate the like elements in the third embodiment. A basic structure of the third embodiment is the same as that described in the second embodiment. However, a part of the process in motor controlling section 8C will be described since it is different from that of each of the first and second embodiments.

Figure 10:
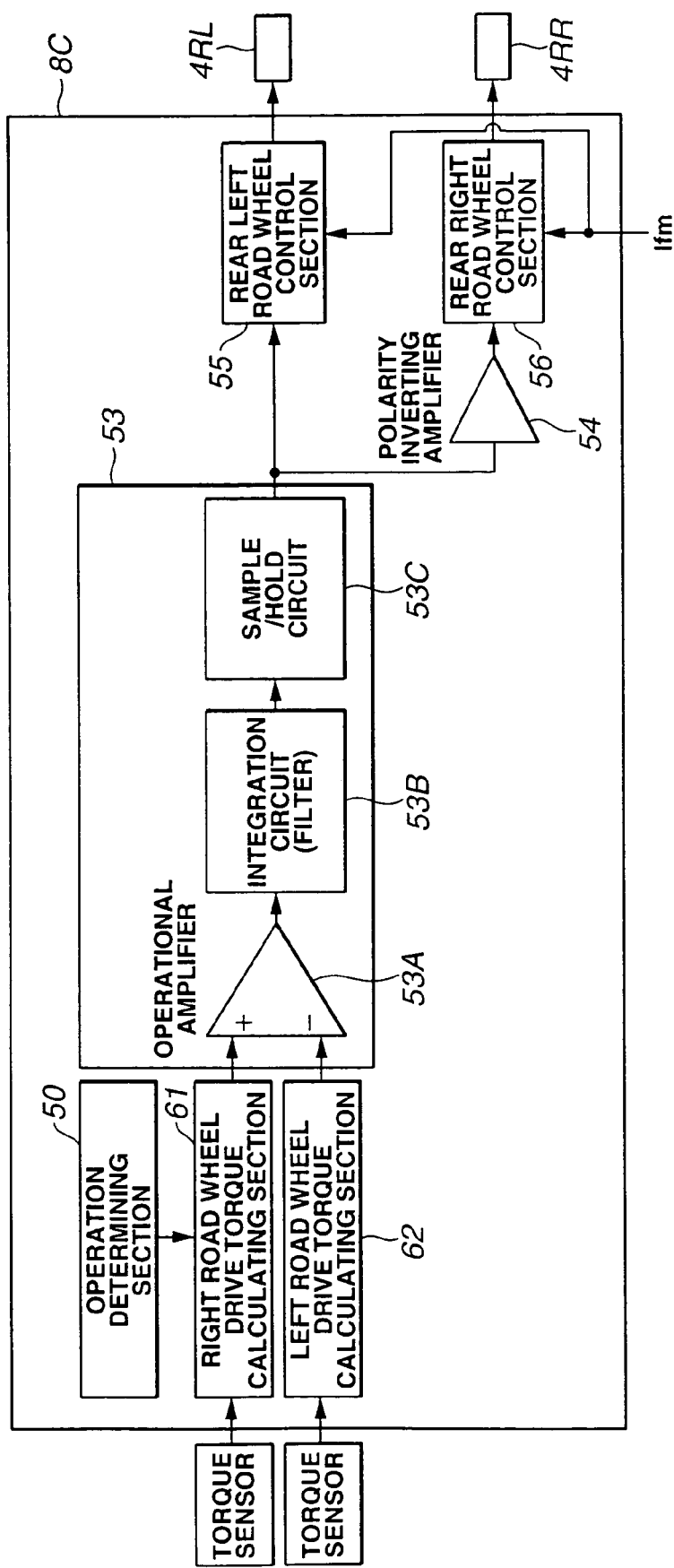
FIG. 10 is a circuit block diagram of a motor controlling section in a third preferred embodiment of the drive controlling apparatus according to the present invention.

Motor controlling section 8C, as shown in FIG. 10, includes operation determining section 50, a right road wheel drive torque calculating section 61, left road wheel drive torque calculating section 62, deviation calculating section 53, polarity inverting amplifier 54, rear left road wheel controlling section 55, and rear right road wheel controlling section 56. Right road wheel drive torque calculating section 61 calculates the drive torque of rear right road wheels 3L and 3R on the basis of signals outputted from a torque sensor installed on left drive motor 4RL and outputs a signal indicating the result of the calculation to operational amplifier 58A. Operational amplifier 53A outputs the deviation with a plus value when right road wheel drive torque is large and outputs the deviation with a minus value when left road wheel drive torque is large.

The other structure of the drive controlling apparatus in the third embodiment is the same as motor controlling section 8C in the second embodiment. In the third embodiment, the value in accordance with the deviation in the developed driving force of the left and right road wheels is calculated and the field current values of left and right road wheels 4RL and 4RR are respectively corrected so as to reduce the deviation (drive torque difference between the left and right driven wheels). The action and advantage of the third embodiment are generally the same as those described in the second embodiment.

Fourth Embodiment

Figure 11:
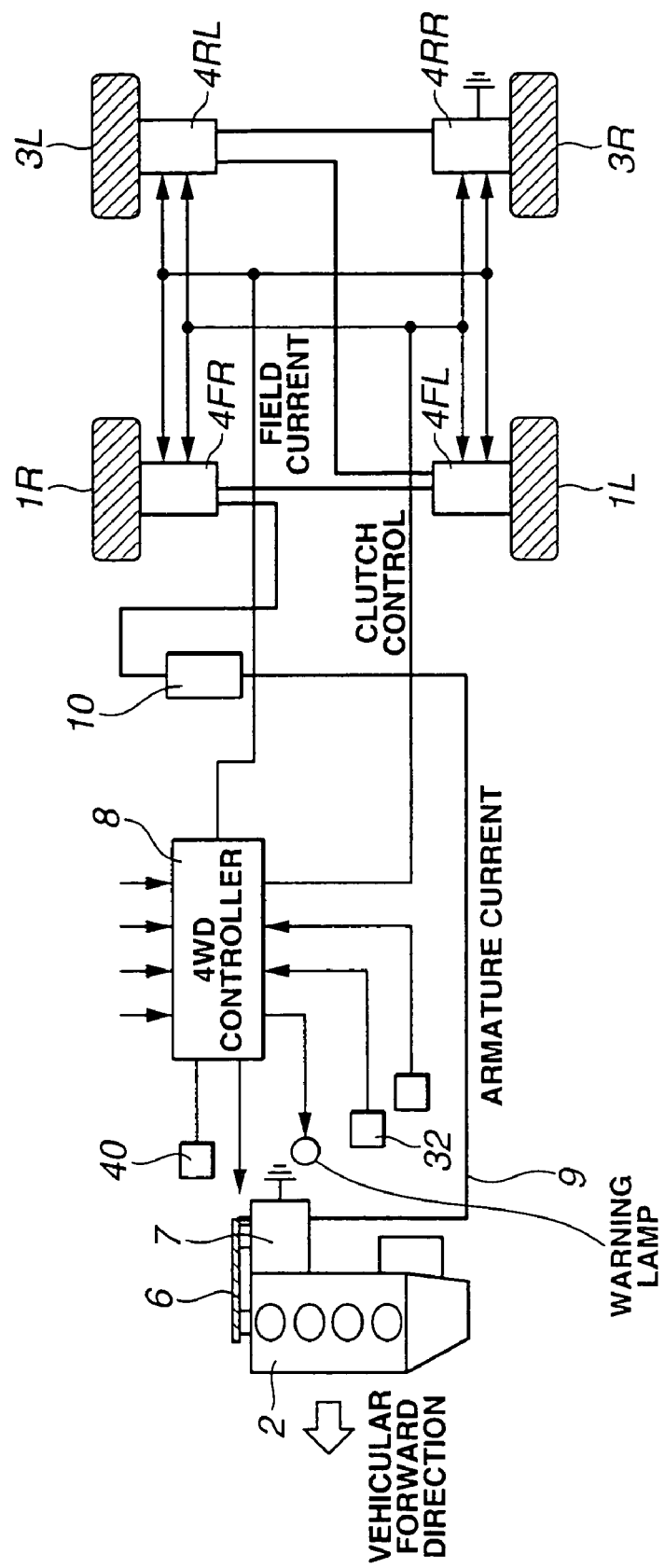
FIG. 11 is a rough configuration view of a drive controlling apparatus in a fourth preferred embodiment according to the present invention.
Figure 12:
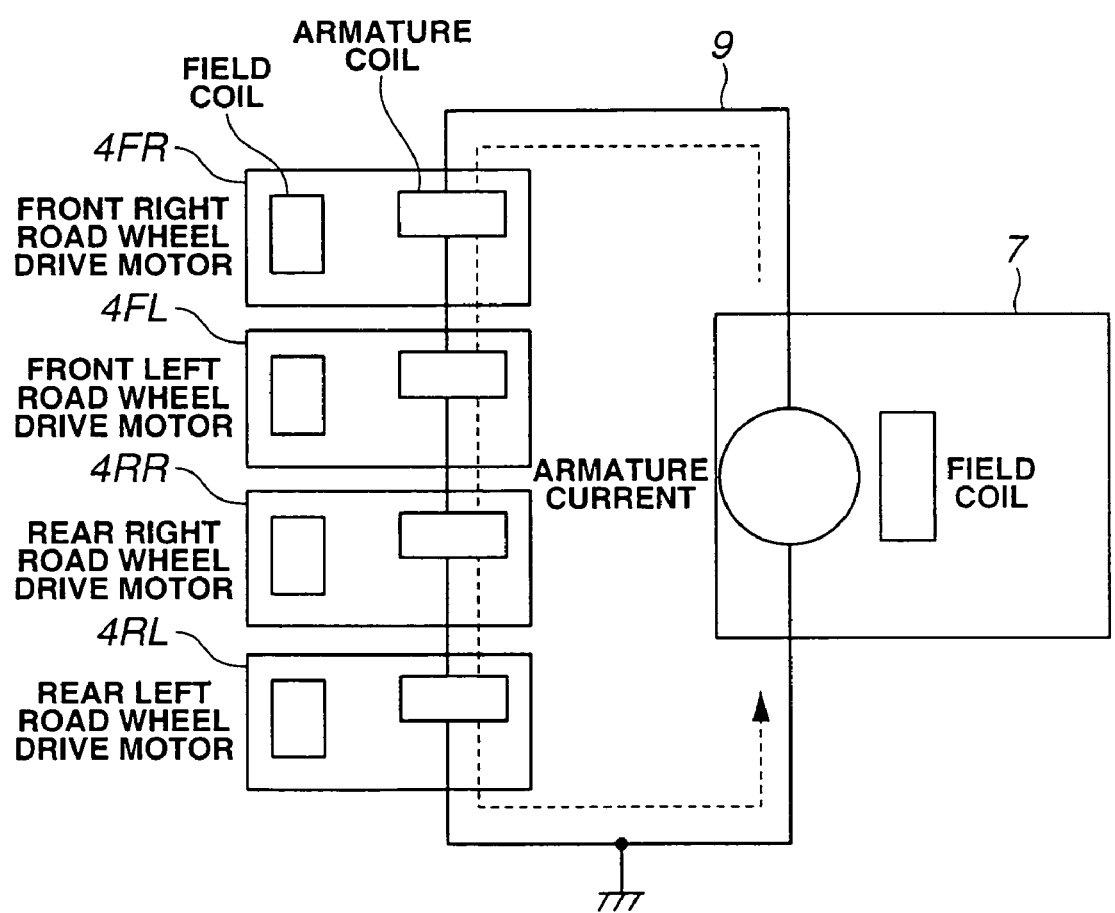
FIG. 12 is a configuration view representing a connection relationship between each motor and each road wheel of the vehicle to which the drive controlling apparatus in the fourth preferred embodiment is applicable.
Figure 13:
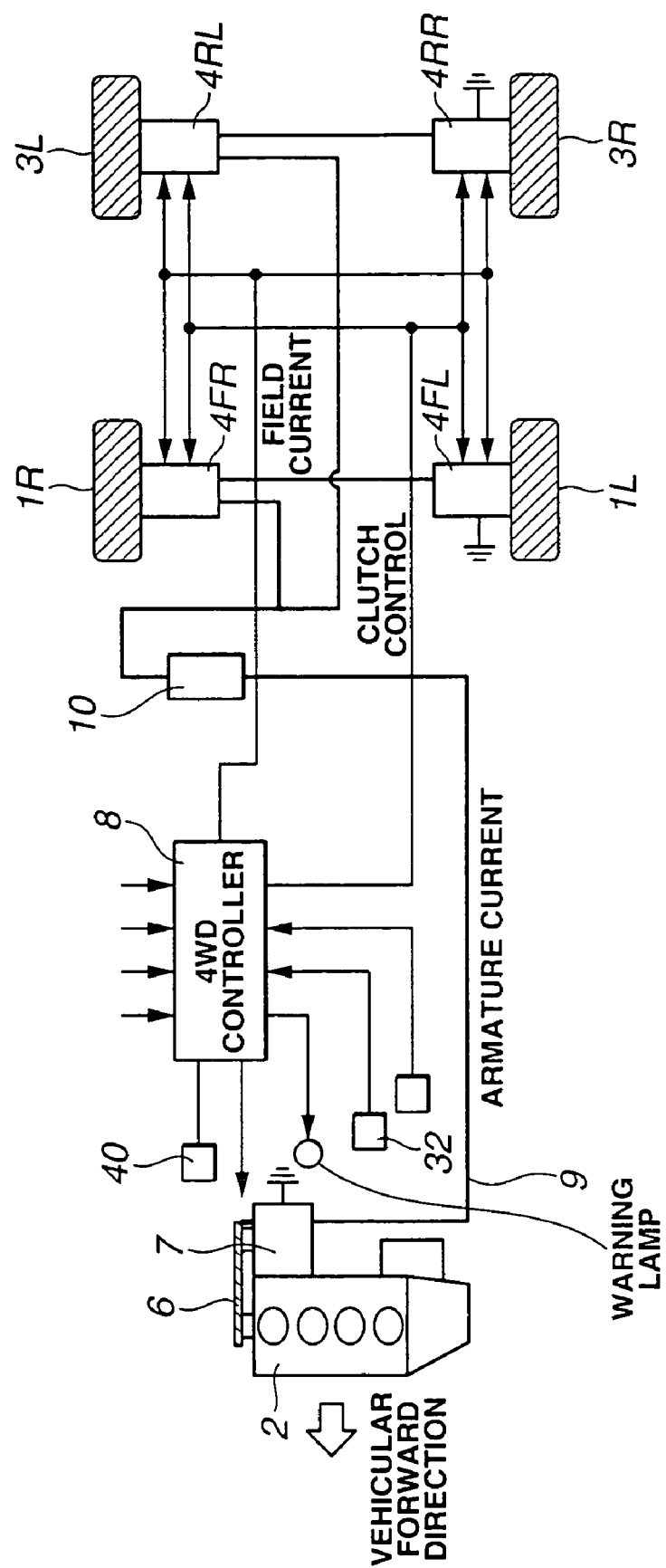
FIG. 13 is a configuration view representing another connection relationship between each motor and each road wheel of the vehicle to which the drive controlling apparatus in the fourth preferred embodiment is applicable.

Next, the drive controlling apparatus in a fourth preferred embodiment will be described with reference to FIG. 11. The same reference numerals as those described in each of the first through third embodiment designate the like elements. FIG. 11 shows a rough configuration view of the drive controlling apparatus in the fourth embodiment. As shown in FIG. 11, the front left and right road wheels are separately and individually drivable by means of drive motors 4FL and 4FR described in the first embodiment. Then, the power can be supplied from generator 7 for the four drive motors 4RL, 4RR, 4FL, and 4FR. In the fourth embodiment, four drive motors 4RL, 4RR, 4FL, and 4FR are electrically serially connected with one another with respect to generator 7 which is a common power supply. In addition, 4WD controller 8 causes generator 7 to be generated in accordance with the accelerator opening angle and, on the basis of the signal from 4WD switch, the connection to or disconnection from the rear left and right drive clutches is carried out. It is noted that the above explanation is based on the main driven wheels which are front road wheels. However, the main driven wheels driven in the two-wheel drive state may be rear road wheels 3L and 3R. A front road-wheel and rear road-wheel switch may be installed so that, in accordance with a situation, the road wheels driven during the two-wheel drive may be switched to front or rear road wheels 3L and 3R. In addition, in a case where the correction control of the field current value described in the second and third embodiments is carried out, the correction of the field current value between the road wheels which provide pairs of the left and right road wheels is carried out. Hence, the correction of the field current value between the front left and right road wheels is carried out independently of the correction of the field current between the rear left and right road wheels. In addition, in the above explanation, all of four wheel drive motors 4RL, 4RR, 4FL, and 4FR are serially connected to generator 7. However, the electrical serial connection may be carried out at least between the road wheels which constitute the pair. In details, as shown in FIG. 13, two drive motors 4RL and 4RR which correspond to left and right road wheels 3L and 3R are serially connected. Two drive motors 4RL and 4RR which correspond to rear left and right road wheels 3L and 3R may be connected in parallel to the other two drive motors 4RL and 4RR which correspond to rear left and right road wheels 3L and 3R.

The stability of the straight run of the vehicle is improved even though the drive control through drive motors 4FL and 4FR of front left and right road wheels are drivingly controlled. In the fourth embodiment, the power supply for rear left and right road wheel drive motors 4RL and 4RR and that for the front left and right road wheels 4RL and 4RR provide the common power supply. However, the power supply of the rear left and right road wheel drive motors 4RL and 4RR may be separated from that of front left and right road wheel drive motors 4FL and 4FR. In summary, the motors driving the road wheels which are opposed in the pair may serially be connected to their common power supply.

Fifth Embodiment

Figure 14:
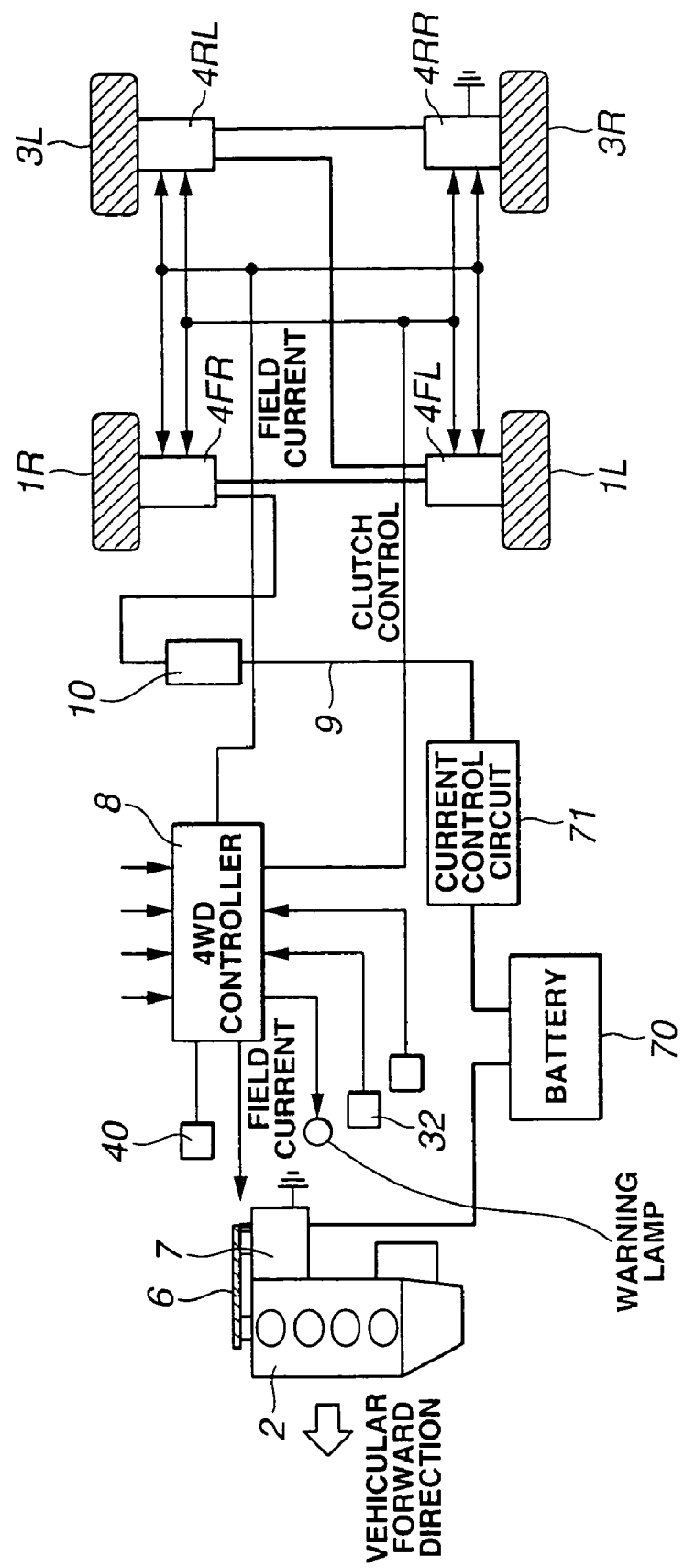
FIG. 14 is a rough configuration view representing a fifth preferred embodiment of the drive controlling apparatus according to the present invention.
Figure 15:
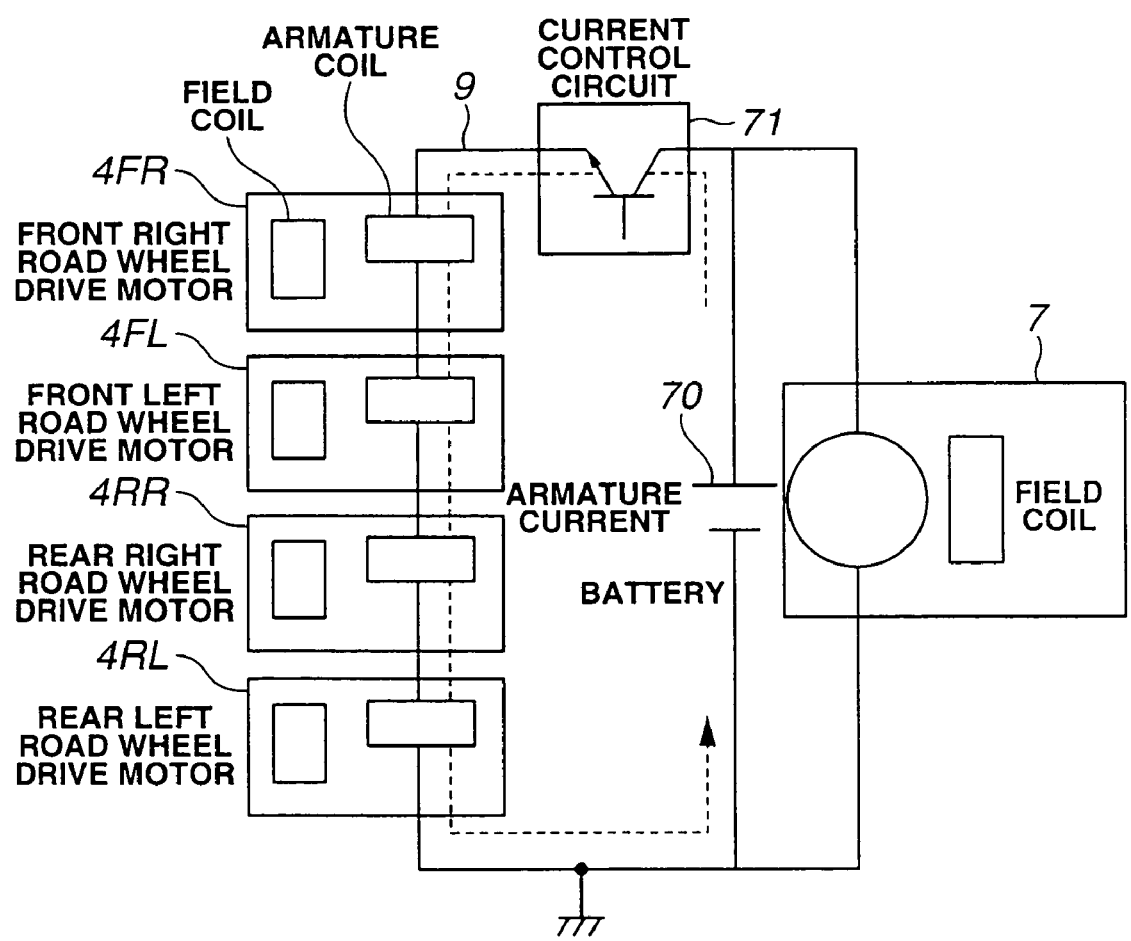
FIG. 15 is a configuration view of a connection relationship between each motor and a corresponding road wheel in the fifth embodiment shown in FIG. 14.

Next, a fifth preferred embodiment of the drive controlling apparatus according to the present invention will be described below with reference to FIGS. 14 and 15. The same reference numerals as those described in each of the first through fourth embodiments designate the like elements in this embodiment. A basic structure of the fifth embodiment, as shown in FIG. 14, is the same as described in the fourth embodiment. However, a difference point from the fourth embodiment is that a common power supply is constituted by generator 7, a battery 70, and a current control circuit 71. In the fifth embodiment, a single current control circuit 71 is provided as a result of the fact that four drive motors 4RL, 4RR, 4FL, and 4FR are serially connected. The structure, action, and advantage are the same as those described in the fourth embodiment.

Sixth Embodiment

Figure 16:
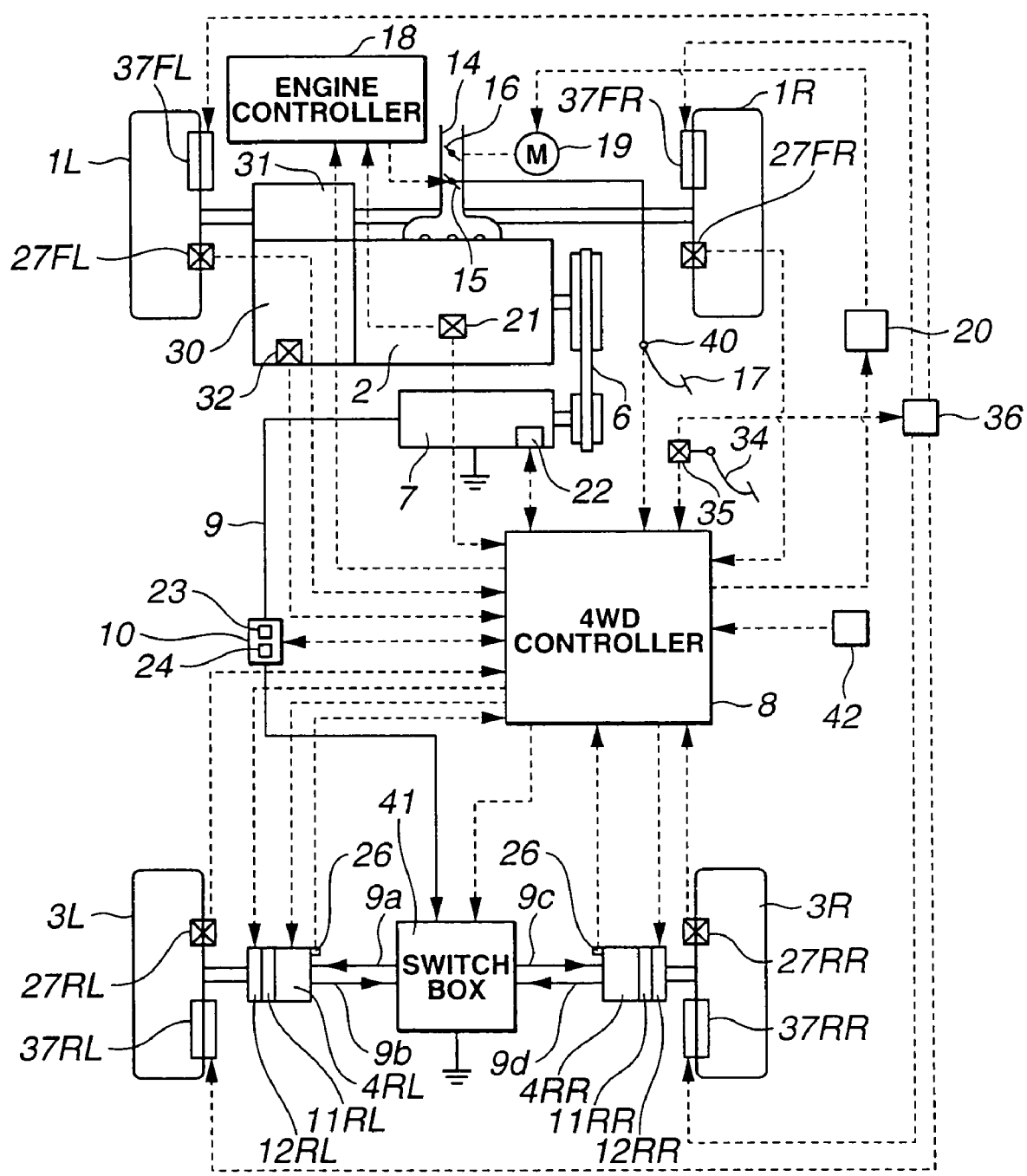
FIG. 16 is a rough configuration view of the drive controlling apparatus in a sixth preferred embodiment according to the present invention.
Figure 17A:
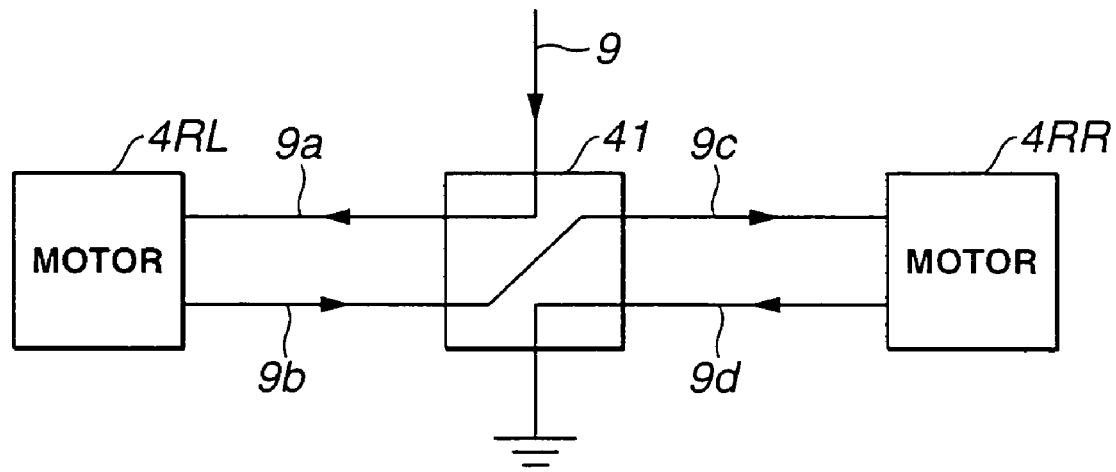
FIGS. 17A and 17B are explanatory views representing switched states of a switch box in the sixth embodiment of the drive controlling apparatus according to the present invention.
Figure 17B:
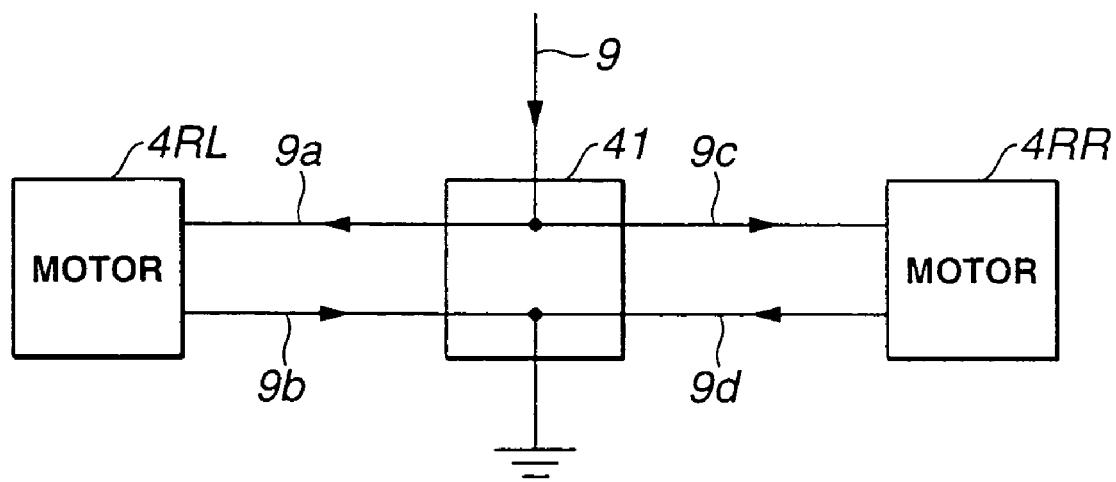
Figure 18:
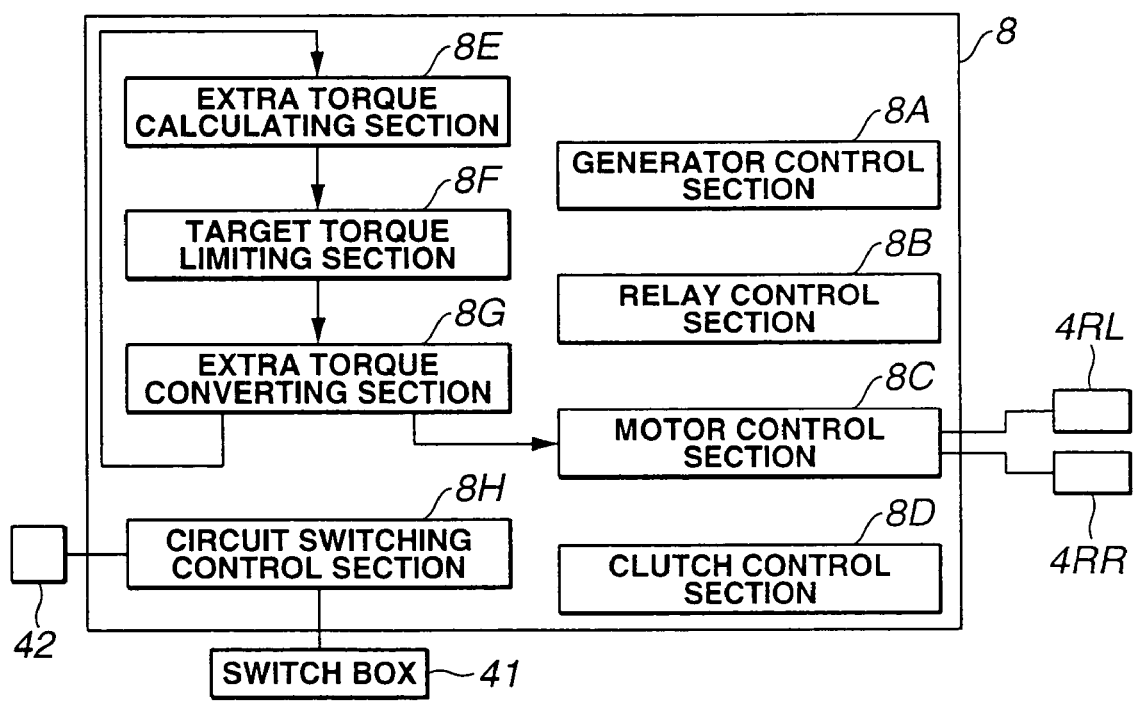
FIG. 18 is a functional block diagram of the 4WD controller in the sixth embodiment shown in FIG. 16.

FIG. 16 shows a rough configuration of the drive controlling apparatus in a sixth preferred embodiment according to the present invention. In the sixth embodiment, drive axles of respective drive motors 4RL and 4RR are directly connected to wheel axles of the corresponding rear road wheels 3L and 3R via speed reducers 11RL and 11RR and clutches 12RL and 12RR. However, the structure of the drive controlling apparatus shown in FIG. 16 is generally the same as that in the first embodiment shown in FIG. 1. Hence, only difference points from the first embodiment will be described below. That is to say, the electric power generated by generator 7 is enabled to be supplied to two drive motors 4RL and 4RR via electric wire. In a midway through electric wire 9, a junction box 10 and a switch box 41 are intervened. Current sensor 23 is disposed within junction box 10 as in the same way as the first embodiment. On the other hand, switch box 41 serves to select one of parallel connection and series connection with left and right drive motors 4RL and 4RR to generator 7. Each terminal of two lines 9a and 9b and 9c and 9d connected to both ends of respective armature coils of left and right drive motors 4RL and 4RR is connected to switch box 41. A signal from 4WD controller 8 switches the electrical connection state between generator 7 and left and right drive motors 4RL and 4RR. That is to say, a serial connection command is issued and inputted to switch box 41, an internal structure of switch box 41 gives as shown in FIG. 17A. Thus, electric wire 9 drawn from generator 7 is connected to one end of the armature coil of left drive motor 4RL via a line 9a and the other end of the armature coil of left drive motor 4RL is connected to one end of the armature coil of right drive motor 4RR via lines 9b and 9c. The other end of the armature coil of right drive motor 4RR is grounded via a line 9d and switch box 41. Consequently, left and right drive motors 4RL and 4RR and generator 7 are connected in series with each other to constitute a serial circuit. On the other hand, when a parallel connection command is issued and inputted to switch box 41, the connection is switched to that shown in FIG. 17B. Electric wire 9 from generator 7 is branched into lines 9a and 9c which are connected to one ends of the armature coils of respective left and right drive motors 4RL and 4RR and the other ends of the armature coils of left and right drive motors 4RL and 4RR are grounded via lines 9b and 9d. Consequently, left and right drive motors 4RL and 4RR are connected in parallel to generator 7 to constitute a parallel circuit. It is noted that switch box 41 constitutes a circuit switching section (means).

Furthermore, circuit switching operation section 42 constituting a selective operation section (means) is disposed on a driver's seat to supply a driver's selected mode to 4WD controller. In the sixth embodiment, selected modes are divided into two kinds of modes, viz., "auto mode (automatic mode) and" LSD mode (LSD mode). "Auto mode" is a mode selectively used automatically one of the serial circuit and the parallel circuit in accordance with a vehicular traveling state. On the other hand, "LSD mode" is a mode by which the parallel circuit is forcibly selected.

Figure 19:
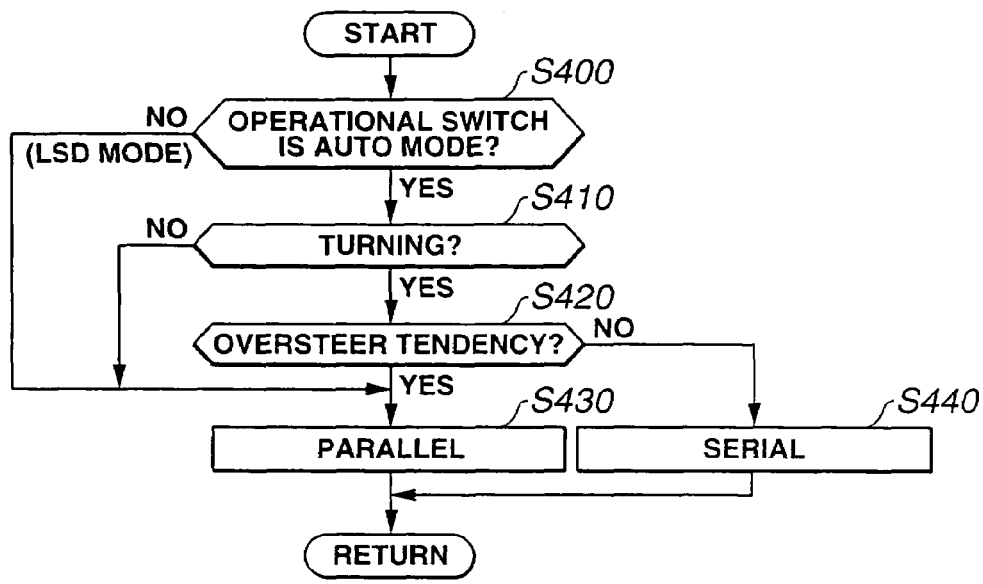
FIG. 19 is an operational flowchart representing a process of a circuit switching control section of the 4WD controller of the drive controlling apparatus in the sixth preferred embodiment according to the present invention.

In addition, 4WD controller 8 functionally includes generator control section 8A, relay control section 8B, motor control section 8C, extra torque calculating section 8E, target torque controlling section 8F, extra torque converting section 8G, and a circuit switching control section 8H which constitutes a circuit switching controlling section (means). The difference point from the first embodiment will only be described below. The flowcharts of FIGS. 5, 6, 7, and 8 are applicable to the sixth embodiment. A process of circuit switching control section 8H will be described with reference to a flowchart of FIG. 19. Circuit switching control section 8h executes the process as shown in FIG. 19 on the basis of the inputted respective signals for each predetermined period of time. At a step S400, circuit switching control section 42 determines whether the mode selected by the driver is "auto mode" or not. If section 8H determines "auto mode" (Yes) at a step S400, the routine goes to a step S410. If section 8H determines "LSD mode" (No), the routine goes to a step S430. A default value of the circuit switching operation section 42 is, for example, set to, for example, LSD mode. At step S410, circuit switching control section 8H determines whether the vehicular running state is in a turning state depending upon whether a steering angle quantity (angular displacement) based on the signal of the steering angle sensor, a magnitude of a lateral G developed on the vehicle detected by a lateral G sensor, and a magnitude of a difference in speed between left and right road wheels is equal to or larger than a predetermined value. If section 8H determines that the vehicular running state is in the turning state, the routine goes to a step S420. If the vehicular running state is not in the turning state (No) at step S410, the routine goes to a step S430. At step S420, circuit switching control section 8H determines whether, for example, the vehicular traveling state is under a tendency of oversteering on the basis of a direction (plus direction or minus direction) of deviation between a target yaw rate determined from, for example, a vehicular body velocity and the steering angle and actual yaw rate actually detected. If section 8H determines that the vehicular driving state is under the oversteering tendency (Yes), the routine goes to step S430. If section 8H determines that the vehicular driving state is not under the oversteering tendency (No) at step S420, the routine goes to a step S440. At step S430, section 8H outputs the parallel connection command to switch box 41 to constitute the parallel circuit described above. At step S440, section 8H outputs the serial connection command to switch box 41 to constitute the serial circuit. It is noted that step S410 constitutes a turning determining section (means) and step S420 constitutes an oversteering determining (means). The process of the engine controller 18 is the same as described in the first embodiment.

The action and advantage of the drive controlling apparatus in the sixth embodiment will be described below.

When the torque transmitted from engine 2 to front road wheels 1L and 1R is larger than a road surface reaction force limit torque due to the low road surface frictional coefficient (low µ) or due to a large depression quantity (depth) of accelerator pedal 17, via., acceleration slips of front road wheels 1L and 1R which are main driven wheels occur, each clutch 12RL and 12RR is connected so that left and right rear road wheels 3L and 3R are connected to drive axles of drive motors 4RL and 4RR, respectively. In addition, generator 7 generates the electric power by means of generator load torque Th in accordance with the acceleration slip quantity so as to be transferred to the four-drive wheel state. Next, the drive torque transmitted to front left and right road wheels 1L and 1R is adjusted to approach to the road surface reaction force limit torque and, then, the vehicle drive state is transferred to the two wheel drive state. Consequently, the acceleration slip on front left and right road wheels 1L and 1R which are main drive wheels is suppressed.

In addition, when the vehicle drive state is transferred in the 4WD (four-wheel-drive) state, the armature current is supplied to left and right drive motors 4RL and 4RR from generator 7 which is a common power supply. In this state, unless the vehicular turning state is determined and the oversteering tendency occurs, as the electrical connection of left and right drive motors 4RL and 4RR with respect to generator 7 which serves as the power supply, the serial circuit is selected. It is noted that, during the vehicular turning, since the motor speed at an inner wheel side (namely, the road wheel speeds at the inner road wheels are relatively slowed, the induced voltage becomes lowered than the inner wheels as compared with the outer wheels. In a case where the parallel circuit is adopted, a motor torque at the inner road wheel side becomes large so that it becomes difficult to turn the vehicle. Whereas, by selecting the serial circuit as in the sixth embodiment, the armature current values supplied to left and right road wheel drive motors 4RL and 4RR take always the same value even if a difference in the induced voltages of left and right drive motors 4RL and 4RR occurs. Hence, the difficulty in turning the vehicle as in the case of the parallel circuit can be avoided.

However, in the case of the vehicular oversteering tendency, the parallel circuit is selected so that the difficulty in the vehicular turning causes a moment suppressing the oversteering tendency to be acted upon the vehicle. Thus, a vehicular stability can be improved. As described above, predetermined turning performance and turning stability can be improved by a simple switching selectively the appropriate electrical connection. The other advantages and alternatives are the same as those described in the first embodiment. The present invention is applicable to a two-wheel-drive electrical vehicle and a motor driven vehicle of a type in which the motors are installed independently on the left and right road wheels.

Seventh Embodiment

Next, a seventh preferred embodiment of the drive controlling apparatus according to the present invention will be described with reference to the drawings. The same reference numerals as those described in each of the first through sixth embodiments designate like elements in the seventh embodiment. A basic structure of the seventh embodiment is generally the same as in the first (or sixth) embodiment. However, the difference point from the sixth embodiment lies in the process of circuit switching controlling section 8H. In addition, the modes of circuit switching operation section 42 in the seventh embodiment are three kinds of "auto mode", "parallel mode", and "serial mode".

Figure 20:
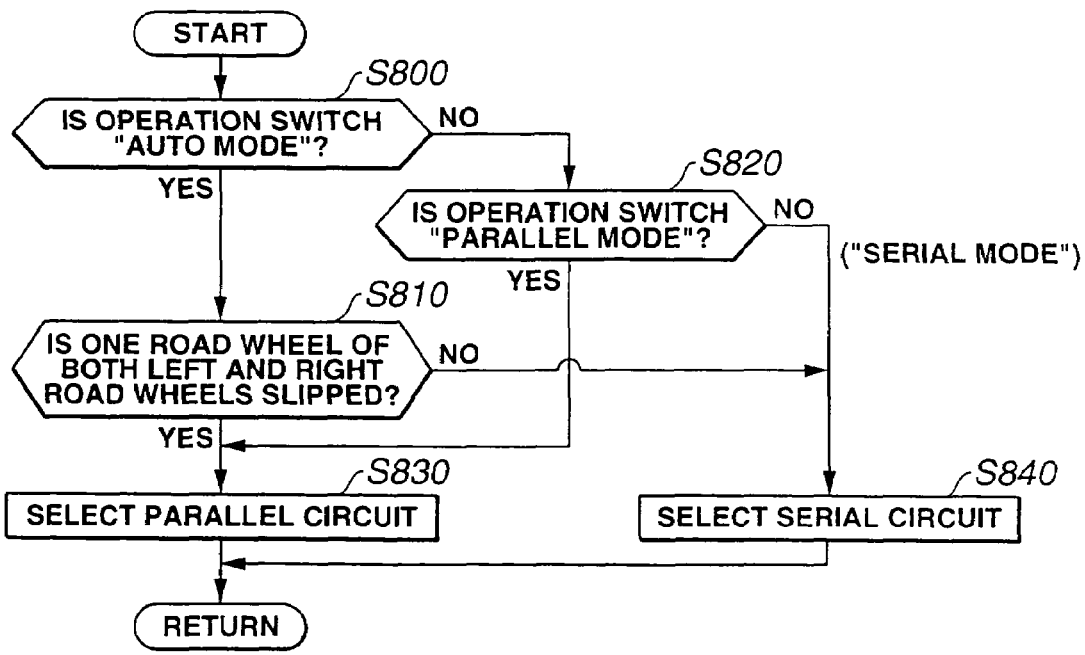
FIG. 20 is an operational flowchart representing a process of a circuit switching control section of the 4WD controller in the seventh preferred embodiment according to the present invention.

Circuit switching control section 8H in the seventh embodiment carries out the process shown in a flowchart of FIG. 20 on the basis of each inputted signal for each predetermined sampling period of time.

That is to say, circuit switching control section 8H determines whether the mode selected by the driver is "auto mode" at a step S800. If section 8H determines that the mode is selected to "auto mode" (Yes) at step S800, the routine goes to a step S810. If section 8H determines that the mode is selected not to the auto mode (No), the routine goes to a step S820. At step S820, section 8H determines if only one of the left and right motor driven road wheels is under the acceleration slip. If section 8H determines that only one of the left and right motor driven road wheels is under the acceleration slip (Yes), the routine goes to a step S830. If section 8H determines that only one of the left and right motor driven road wheels is not under the acceleration slip (No) at step S840. The determination of whether only one of the left and right motor driven road wheels is under the acceleration slip is carried out as follows. That is to say, for example, a turning radius is determined from the detected vehicular body velocity, the steering angular displacement, and the lateral G and an actual road wheel velocity of the one of the left and right road wheels is larger or not than each of reference road wheel velocities of the left and right road wheels calculated on the basis of the turning radius may detect the acceleration slip on one of the left and right road wheels. Step S810 constitutes an acceleration slip detecting section (means).

At step S820, section 8H determines whether the mode selected by the driver is "parallel mode". If "parallel mode" is selected, the routine goes to a step S830. If section 8H determines that "serial mode" is selected (No), the routine goes to a step S840. At step S830, section 8H outputs the parallel connection command to switch box 41 and the routine is returned to step S800. If section 8H determines that the mode is not selected to the parallel mode, the routine goes to step S840. At step S840, section 8H outputs the serial connection command to switch box 41 and the process is ended (the routine is returned to step S800). It is noted that, as the process of circuit switching control section 8H, the process shown in FIG. 20 may be used during the straight run. During the turning, the process shown in FIG. 19 described in the sixth embodiment may be used.

In addition, in a case where, in motor controlling section in the seventh embodiment, the determination that the serial circuit is selected, the following control for the serial circuit is carried out. The serial circuit purpose control section is already described in the third embodiment shown in FIG. 10.

The action and advantage of the seventh embodiment will be described below.

In a state in which the road wheel speed difference between the left and right road wheels is almost present even though the straight run of the vehicle, the serial circuit is selected. Consequently, armature current flowing through both of left and right road wheels 4RL and 4RR becomes mutually the same. The drive torques of left and right drive motors become mutually the same. Furthermore, driving forces developed on the left and right road wheels driven by respectively corresponding drive motors become mutually the same. Consequently, the stability driving the vehicular straight run is improved. Furthermore, in a case where one of the left and right road wheels is in the acceleration slip state even through the vehicle runs in the straight line, the circuit is selected to the parallel circuit so that a difference limit function is activated. Then, the drive torque is applied to one of the left and right road wheels which is not in the acceleration slip state without failure so that the acceleration performance can be improved. The other structure, action, and advantages of the seventh embodiment are the same as those described in the first and sixth embodiments.

It is noted that the serial circuit purpose controlling section of motor controlling section 8C may be constituted by operation determining section 50, left road wheel drive torque calculating section 61, right road wheel torque calculating section 62, deviation calculating section 53, polarity inverting section 54, rear left road wheel controlling section 55, and rear right road wheel controlling section 56, as shown in FIG. 10. In details, right road wheel drive torque calculating section 61 calculates the drive torque of the rear right road wheel 3R on the basis of the output signal of the torque sensor installed on right drive motor 4RR and outputs the drive torque calculated to operational amplifier 53A. Left drive torque calculating section 62 calculates the drive torque of rear left road wheel 3L on the basis of the output signal of torque sensor disposed on left drive motor 4RL and outputs the calculated rear left road wheel to operational amplifier 53A. Operational amplifier 53A outputs the deviation with the plus value when the right road wheel drive torque is larger than the left road wheel drive torque and outputs the deviation with the minus value when the left road wheel drive torque is larger than the right road wheel torque. The other structure of motor controlling section 8C is the same as described in motor controlling section 8C in the second embodiment. In this case, the value in accordance with the deviation in the developed driving forces between the left and right road wheels is calculated from a torque difference between the left and right road wheels and the field current values of left and right drive motors 4RL and 4RR are respectively corrected so as to reduce the deviation therein.

The entire contents of Japanese Patent Applications No. 2003-105999 (filed in Japan on Apr. 10, 2003) and No. 2003-113278 (filed in Japan on Apr. 17, 2003) are herein incorporated by reference. The scope of the invention is defined with reference to the following claims.

What is claimed is:

1. A drive controlling apparatus for an automotive vehicle, comprising:
   at least one couple of road wheels that constitutes one pair of parallel road wheels with respect to a vehicular width direction located on the same axis of the vehicular width direction;
   a plurality of motors driving independently and separately each road wheel of the pair of parallel road wheels; and
   a power supply to supply an electric power to the plurality of motors, the plurality of motors driving respective road wheels of the pair of parallel road wheels being enabled to constitute a serial circuit with respect to the power supply,
   wherein the driving controlling apparatus further comprises: a driving force difference detecting section that detects a difference in a driving force on each of the road wheels which constitutes the pair of parallel road wheels from among the road wheels driven by respective motors; and a field current correcting section that corrects a field current value of each motor driving the pair of parallel road wheels on the basis of the difference in the driving force.

2. A drive controlling apparatus for an automotive vehicle as claimed in claim 1, wherein the vehicle is equipped with an internal combustion engine and the power supply comprises a generator driven by a power of the internal combustion engine.

3. A drive controlling apparatus for an automotive vehicle as claimed in claim 1, wherein the field current correcting section corrects the field current value of each motor connected to a corresponding one of the pair of parallel road wheels to make the driving forces of the pair of parallel road wheels equal to each other on the basis of a detection result of the driving force difference detecting section when the vehicle is determined to travel in a straight line.

4. A drive controlling apparatus for an automotive vehicle as claimed in claim 3, wherein the field current correcting section corrects the field current value of each motor connected to the corresponding one of the pair of parallel road wheels in such a manner as to relatively reduce the field current value of one of the motors disposed for the corresponding one of the pair of parallel road wheels on which a large driving force is developed and to raise the field current value of the other of the motors disposed for the other of the pair of parallel road wheels on which a small driving force is developed.

5. A drive controlling apparatus for an automotive vehicle as claimed in claim 4, wherein the field current correcting section corrects the field current value for each motor connected to a corresponding one of the pair of parallel road wheels at the same timing in such a manner that absolute values of respective field current values of the respective motors are made equal to each other.

6. A drive controlling apparatus for an automotive vehicle as claimed in claim 1, wherein the pair of parallel road wheels are constituted by rear left and right road wheels and wherein front left and right road wheels are driven by a power supply of an internal combustion engine of the vehicle and the power supply comprises a generator driven by a power of the internal combustion engine, wherein each of the pair of parallel road wheels which are rear left and right road wheels is directly coupled to a drive axle of a corresponding one of the motors via a clutch and a speed reducer, and wherein the drive controlling apparatus further comprises a front road wheel acceleration slip detecting section that detects an acceleration slip of each of front left and right road wheels and wherein the clutch of each of the rear left and right road wheels is engaged, the generator generates an electrical power by a generator load torque (Th) according to an acceleration slip quantity for the vehicle to be transferred into a four-wheel drive state, and, thereafter, a drive torque transmitted to each of the front left and right road wheels is adjusted to approach to a road surface reaction force limit torque for the vehicle to be transferred into a two-wheel drive state when the acceleration slip detecting section detects the acceleration slip.

7. A drive controlling apparatus for an automotive vehicle as claimed in claim 1, wherein the driving force difference detecting section detects the difference in the driving force on front left and right road wheels driven by a power of an internal combustion engine equipped in the vehicle and the pair of parallel road wheels are rear left and right road wheels and wherein the driving force difference detecting section detects the difference in the driving force according to at least one of a difference between a target yaw rate and an actual yaw rate and a difference between drive torques of the front left and right road wheels.

8. A drive controlling apparatus for an automotive vehicle as claimed in claim 1, wherein front left and right and rear left and right road wheels are constituted by the pairs of parallel road wheels and each motor connected to a corresponding one of the front left and right and rear left and right road wheels is connected in series with the power supply.

9. A drive controlling apparatus for an automotive vehicle as claimed in claim 1, wherein front left and right road wheels are constituted by the pair of parallel road wheels and rear left and right road wheels are constituted by another pair of parallel road wheels and wherein the motors serially connected to the front left and right road wheels and other motors serially connected to the rear left and right road wheels are connected in parallel to each other.

10. A drive controlling apparatus for an automotive vehicle, comprising:

at least one couple of road wheels that constitutes one pair of parallel road wheels with respect to a vehicular width direction located on the same axis of the vehicular width direction;

a plurality of motors driving independently and separately each road wheel of the pair of parallel road wheels;

a power supply to supply an electric power to the plurality of motors, the plurality of motors driving respective road wheels of the pair of parallel road wheels being enabled to constitute a serial circuit with respect to the power supply, wherein the plurality of motors driving respective road wheels of the pair of parallel road wheels are enabled to constitute a parallel circuit with respect to the power supply and wherein the drive controlling apparatus further comprises: a circuit switching section that selectively sets an electrical connection of the plurality of motors with respect to the power supply to one of the parallel circuit and the serial circuit; and a circuit switching control section that controls the circuit switching section to set the electrical connection of the plurality of motors with respect to the power supply to one of the parallel circuit and the serial circuit in accordance with at least one of a travel state of the vehicle and a manipulation for the vehicle; and an oversteering tendency determining section that determines whether the vehicle indicates a tendency of an oversteering and wherein the circuit switching control section controls the circuit switching section to select the parallel circuit when the oversteering tendency determining section determines that the vehicle indicates the tendency of the oversteering.

11. A drive controlling apparatus for an automotive vehicle as claimed in claim 10, wherein the drive controlling apparatus further comprises a vehicular turning determining section that determines whether a travel state of the vehicle is a turning state and the circuit switching control section controls the circuit switching section to select the serial circuit when the vehicular turning determining section determines that the travel state of the vehicle is turned.

12. A drive controlling apparatus for an automotive vehicle as claimed in claim 10, wherein the drive controlling apparatus further comprises an acceleration slip detecting section that detects a presence or an absence of each acceleration slip of left and right road wheels driven by the individual motors and wherein the circuit switching control section controls the circuit switching section to select the parallel circuit when the acceleration slip detecting section detects that only one of the pair of parallel road wheels is in an acceleration slip state.

13. A drive controlling apparatus for an automotive vehicle as claimed in claim 10, wherein the drive controlling apparatus further comprises a selective operation section that is selectable of one of the parallel circuit and the serial circuit according to a manipulation thereof and wherein the circuit switching control section controls the circuit switching section to select one of the parallel and serial circuits according to the manipulation of the selective operation section.

14. A drive controlling apparatus for an automotive vehicle as claimed in claim 10, wherein one of front and rear road wheels of the vehicle is driven by an internal combustion engine equipped in the vehicle, the other of the front and rear road wheels is driven by the plurality of motors, and the power supply comprises a generator driven by a power of the internal combustion engine.

15. A drive controlling apparatus for an automotive vehicle, comprising:

road wheel means for constituting one pair of parallel road wheels with respect to a vehicular width direction located on the same axis of the vehicular width direction;

motor means for driving independently and separately the road wheel means of the pair of parallel road wheels; and power supply means for supplying an electric power to the motor means, the motor means driving the road wheel means of the pair of parallel road wheels being enabled to constitute a serial circuit with respect to the power supply means, wherein the driving controlling apparatus further comprises: driving force difference detecting means for detecting a difference in a driving force on each of the road wheels which constitutes the pair of parallel road wheels from among the road wheels driven by means of the respective motor means; and field current correcting means for correcting a field current value of each motor driving the pair of parallel road wheels on the basis of the difference in the driving force.

16. A drive controlling method for an automotive vehicle, comprising:

providing at least one couple of road wheels that constitutes one pair of parallel road wheels with respect to a vehicular width direction located on the same axis of the vehicular width direction;

providing a plurality of motors driving independently and separately each road wheel of the pair of parallel road wheels;

providing a power supply supplying an electric power to the plurality of motors; and enabling the plurality of motors driving respective road wheels of the pair of parallel road wheels to constitute a serial circuit with respect to the power supply, wherein the driving controlling method further comprises: detecting a difference in a driving force on each of the road wheels which constitutes the pair of parallel road wheels from among the road wheels driven by the respective motor; and correcting a field current value of each motor driving the pair of parallel road wheels on the basis of the difference in the driving force.

* * * * *